US012677087B2

(12) United States Patent
Audfray et al.

(10) Patent No.: US 12,677,087 B2
(45) Date of Patent: Jul. 7, 2026

(54) DUAL MODE PORTED SPEAKER

(71) Applicant: Magic Leap, Inc., Plantation, FL (US)

(72) Inventors: Remi Samuel Audfray, San Francisco, CA (US); Mark Blanchard, Margate, FL (US)

(73) Assignee: MAGIC LEAP, INC., Plantation, FL (US)

( * ) Notice: Subject to any disclaimer, the term of this patent is extended or adjusted under 35 U.S.C. 154(b) by 78 days.

(21) Appl. No.: 18/029,358

(22) PCT Filed: Sep. 30, 2021

(86) PCT No.: PCT/US2021/053040
§ 371 (c)(1),
(2) Date: Mar. 29, 2023

(87) PCT Pub. No.: WO2022/072747
PCT Pub. Date: Apr. 7, 2022

(65) Prior Publication Data

US 2023/0388690 A1 Nov. 30, 2023

Related U.S. Application Data

(60) Provisional application No. 63/085,479, filed on Sep. 30, 2020.

(51) Int. Cl.
*H04R 1/10* (2026.01)
*H04R 1/02* (2006.01)

(52) U.S. Cl.
CPC ............... *H04R 1/10* (2013.01); *H04R 1/028* (2013.01)

(58) Field of Classification Search
CPC ...... H04R 1/10; H04R 1/1058; H04R 1/1008; H04R 1/1016; H04R 1/1075;
(Continued)

(56) References Cited

U.S. PATENT DOCUMENTS 4,852,988 A 8/1989 Velez
6,433,760 B1 8/2002 Vaissie
(Continued)

FOREIGN PATENT DOCUMENTS

CA 2316473 A1 1/2001
CA 2362895 A1 12/2002
(Continued)

OTHER PUBLICATIONS

International Preliminary Report with Written Opinion mailed Apr. 13, 2023, for PCT Application No. PCT/US2021/53040, six pages.
(Continued)

*Primary Examiner* — Ahmad F. Matar
*Assistant Examiner* — Sabrina Diaz
(74) *Attorney, Agent, or Firm* — KLINTWORTH & ROZENBLAT LLP

(57) ABSTRACT

Systems and methods for presenting audio using an audio system supporting multiple modes of operation are disclosed. In some embodiments, elements of the audio system are configured to operate in the different modes. For example, the audio system is configured to operate in a first mode and a second mode. The audio system may be operating in the first mode or the second mode based on an application running on a system or a signal generated by the system.

18 Claims, 13 Drawing Sheets

(58) Field of Classification Search
CPC .... H04R 1/1091; H04R 5/033; H04R 5/0335; H04R 2205/022; H04R 2201/10
USPC .................................. 381/74, 370, 373, 376
See application file for complete search history.

(56) References Cited

U.S. PATENT DOCUMENTS

| | | | |
|---|---|---|---|
| 6,491,391 | B1 | 12/2002 | Blum et al. |
| 6,847,336 | B1 | 1/2005 | Lemelson |
| 6,943,754 | B2 | 9/2005 | Aughey |
| 6,977,776 | B2 | 12/2005 | Volkenandt et al. |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,929,589 | B2 | 1/2015 | Publicover et al. |
| 9,010,929 | B2 | 4/2015 | Lewis |
| 9,274,338 | B2 | 3/2016 | Robbins et al. |
| 9,292,973 | B2 | 3/2016 | Bar-zeev et al. |
| 9,323,325 | B2 | 4/2016 | Perez et al. |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 10,848,846 | B2 * | 11/2020 | Evans ..................... G06F 3/012 |
| 2003/0030597 | A1 | 2/2003 | Geist |
| 2006/0023158 | A1 | 2/2006 | Howell et al. |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2013/0077147 | A1 | 3/2013 | Efimov |
| 2014/0195918 | A1 | 7/2014 | Friedlander |
| 2015/0168731 | A1 | 6/2015 | Robbins |
| 2016/0330537 | A1 * | 11/2016 | Barrentine ........... H04R 1/1008 |
| 2016/0330563 | A1 * | 11/2016 | Chen ....................... H04S 7/303 |
| 2018/0095541 | A1 | 4/2018 | Gribetz et al. |
| 2020/0213731 | A1 * | 7/2020 | Miller ................. G10L 21/0232 |

FOREIGN PATENT DOCUMENTS

| | | | |
|---|---|---|---|
| CA | 2388766 | A1 | 12/2003 |
| EP | 3675524 | A1 | 7/2020 |

OTHER PUBLICATIONS

Jacob, R. “Eye Tracking in Advanced Interface Design”, Virtual Environments and Advanced Interface Design, Oxford University Press, Inc. (Jun. 1995).

Rolland, J. et al., “High-resolution inset head-mounted display”, Optical Society of America, vol. 37, No. 19, Applied Optics, (Jul. 1, 1998).

Tanriverdi, V. et al. (Apr. 2000). “Interacting With Eye Movements in Virtual Environments,” Department of Electrical Engineering and Computer Science, Tufts University, Medford, MA 02155, USA, Proceedings of the SIGCHI conference on Human Factors in Computing Systems, eight pages.

Yoshida, A. et al., “Design and Applications of a High Resolution Insert Head Mounted Display”, (Jun. 1994).

* cited by examiner

DUAL MODE PORTED SPEAKER

CROSS REFERENCE TO RELATED APPLICATIONS

This Application is a national stage application under 35 U.S.C. § 371 of International Application No. PCT/US2021/053040, filed internationally on Sep. 30, 2021, which claims the benefit of U.S. Provisional Application No. 63/085,479 filed on Sep. 30, 2020, the entire disclosure of which is herein incorporated by reference for all purposes.

FIELD

This disclosure relates in general to systems and methods for presenting audio content, and in particular, to systems and methods for an audio system supporting multiple modes of operation.

BACKGROUND

A wearable head device may be used for different applications. For example, the wearable head device may be running an entertainment application for a user in a private space, and privacy may not be a concern. As another example, the wearable device may be running a conferencing application in a public space, and privacy may be a concern. As yet another example, multiple wearable head devices may be used in a same space, and audio interference between devices may be a concern. For each of the different applications, a particular mode of audio presentation may be preferred to optimize user experience.

Existing audio systems may not be sufficient for a wearable device because they may present audio in only one mode and may not present audio in different modes suitable for the different applications. For example, sealed enclosures can provide strong sound pressure levels, which may be suitable for situations when privacy is not a concern, but may not offer radiation control, especially at low frequency, which may be suitable for situations when privacy is a concern. Ported enclosures can be used to obtain a more controlled radiation pattern, but may require higher driver excursion and provide overall a lower output level, especially at low frequency. Therefore, it would be desirable for an audio system of a wearable head device to be able to present audio in different modes of operation, depending on the application, to optimize user experience.

BRIEF SUMMARY

Systems and methods for presenting audio using an audio system supporting multiple modes of operation are disclosed. In some embodiments, elements of the audio system are configured to operate in the different modes. For example, the audio system is configured to operate in a first mode and a second mode. The audio system may be operating in the first mode or the second mode based on an application running on a system or a signal generated by the system. As an exemplary advantage, the audio system allows a system to optimize user experience by being able to present audio in different modes of operation depending on the application or the signal.

In some embodiments, a wearable head device comprises an audio system, wherein: the audio system comprises a speaker component, the speaker component comprises an enclosure, the audio system is configured to operate in a first mode and a second mode, in accordance with the audio system operating in the first mode, the enclosure comprises a sealed enclosure, and in accordance with the audio system operating in the second mode, the enclosure comprises a ported enclosure.

In some embodiments, a port of the audio signal is configured to operate in one or more of a closed state and an open state, in accordance with the audio system operating in the first mode, the port of the audio system operates in the closed state, and in accordance with the audio system operating in the second mode, the port of the audio system operates in the open state.

In some embodiments, in accordance with the audio system operating in the second mode, the audio system provides a first audio radiation at a first level in a first direction and a second audio radiation at a second level in a second direction, and the second level is lower than the first level.

In some embodiments, the first mode is associated with a first application running on the wearable head device, the audio system operates in the first mode in accordance with a determination that the first application is running on the wearable head device, the second mode is associated with a second application of the wearable head device, and the audio system operates in the second mode in accordance with a determination that the second application is running on the wearable head device.

In some embodiments, the device further comprises a digital signal processor (DSP), wherein: the DSP is configured to operate in one or more of a first setting and a second setting, in accordance with the audio system operating in the first mode, the DSP operates in the first setting, and in accordance with the audio system operating in the second mode, the DSP operates in the second setting.

In some embodiments, the device further comprises a mechanical system, wherein: the mechanical system is configured to define one or more of the sealed enclosure and the ported enclosure, in accordance with the audio system operating in the first mode, the mechanical system defines the sealed enclosure, and in accordance with the audio system operating in the second mode, the mechanical system defines the ported enclosure.

In some embodiments, the device further comprises a feedback sensor configured to indicate presence of feedback in an environment of the wearable head device, wherein: the audio system is further configured to operate in a third mode, in response to receiving data, from the feedback sensor, indicating presence of feedback in the environment of the wearable head device.

In some embodiments, the audio system comprises a sliding door, and the sliding door is configured to define the sealed enclosure and the ported enclosure.

In some embodiments, the audio system comprises a ductile plug, and the ductile plug is configured to define the sealed enclosure and the ported enclosure.

In some embodiments, the device is configured to receive first sensor data and second sensor data, wherein: the audio system is configured to operate in the first mode in response to the device receiving the first sensor data, and the audio system is configured to operate in the second mode in response to the device receiving the second sensor data.

In some embodiments, the audio system is further configured to operate in a third mode and to present spatial audio associated with a virtual environment of the wearable head device, and the third mode is associated with the spatial audio.

In some embodiments, the audio system is configured to operate in the first mode in response to receiving a first signal, and the audio system is configured to operate in the second mode in response to receiving a second signal.

In some embodiments, a wearable head device comprising an audio system, wherein: the audio system comprises at least one of a port, a dynamic driver, a back volume, a front volume, a tunnel, a funnel, a reflector, and a diffuser, the audio system is configured to operate in a first mode and a second mode, in accordance with the audio system operating in the first mode, the at least one of the port, the dynamic driver, the back volume, the front volume, the tunnel, the funnel, the reflector, and the diffuser is in a first configuration, and in accordance with the audio system operating in the second mode, the at least one of the port, the dynamic driver, the back volume, the front volume, the tunnel, the funnel, the reflector, and the diffuser is in a second configuration.

In some embodiments, a method of operating a wearable head device comprising an audio system, wherein: the audio system comprises a speaker component, and the speaker component comprises an enclosure, the method comprising: in accordance with a determination that the audio system is operating in a first mode, configuring the enclosure to comprise a sealed enclosure; and in accordance with a determination that the audio system is operating in a second mode, configuring the enclosure to comprise a ported enclosure.

In some embodiments, the method further comprises: in accordance with a determination that the audio system is operating in the first mode, closing a port of the audio system; and in accordance with a determination that the audio system is operating in the second mode, opening the port of the audio system.

In some embodiments, the method further comprises in accordance with a determination that the audio system is operating in the second mode, providing a first audio radiation at a first level in a first direction and a second audio radiation at a second level in a second direction, wherein the second level is lower than the first level.

In some embodiments, the first mode is associated with a first application running on the wearable head device, the second mode is associated with a second application of the wearable head device, the method further comprises determining an application running on the wearable head device, the audio system operates in the first mode in accordance with a determination that the first application is running on the wearable head device, and the audio system operates in the second mode in accordance with a determination that the second application is running on the wearable head device.

In some embodiments, the wearable head device further comprises a digital signal processor (DSP) configured to operate in one or more of a first setting and a second setting, the method further comprising: in accordance with a determination that the audio system is operating in the first mode, operating the DSP in the first setting; and in accordance with a determination that the audio system is operating in the second mode, operating the DSP in the second setting.

In some embodiments, the wearable head device further comprises a mechanical system, the mechanical system configured to define one or more of the sealed enclosure and the ported enclosure, the method further comprising: in accordance with the audio system operating in the first mode, defining, with the mechanical system, the sealed enclosure; and in accordance with the audio system operating in the second mode, defining, with the mechanical system, the ported enclosure.

In some embodiments, the wearable head device further comprises a feedback sensor configured to indicate presence of feedback in an environment of the wearable head device, the method further comprising in response to receiving data, from the feedback sensor, indicating presence of feedback in the environment of the wearable head device, operating the audio system in a third mode.

In some embodiments, the audio system comprises a sliding door, and the sliding door is configured to define the sealed enclosure and the ported enclosure.

In some embodiments, the audio system comprises a ductile plug, and the ductile plug is configured to define the sealed enclosure and the ported enclosure.

In some embodiments, the wearable head device is configured to receive first sensor data and second sensor data, the method further comprising receiving sensor data, wherein: the audio system is configured to operate in the first mode in response to the device receiving the first sensor data, and the audio system is configured to operate in the second mode in response to the device receiving the second sensor data.

In some embodiments, the method further comprises: operating the audio system in a third mode is associated with a spatial audio associated with a virtual environment of the wearable head device; and in accordance with the audio system operating in the third mode, presenting the spatial audio.

In some embodiments, the method further comprises receiving a signal, wherein: the audio system operates in the first mode in accordance with a determination that the signal comprises a first signal, and the audio system operates in the second mode in accordance with a determination that the signal comprises a second signal.

In some embodiments, a method of operating a wearable head device comprising an audio system, wherein the audio system comprises at least one of a port, a dynamic driver, a back volume, a front volume, a tunnel, a funnel, a reflector, and a diffuser, the method comprises: in accordance with the audio system operating in the first mode, configuring the at least one of the port, the dynamic driver, the back volume, the front volume, the tunnel, the funnel, the reflector, and the diffuser in a first configuration; and in accordance with the audio system operating in the second mode, configuring the at least one of the port, the dynamic driver, the back volume, the front volume, the tunnel, the funnel, the reflector, and the diffuser in a second configuration.

In some embodiments, a non-transitory computer-readable medium stores instructions that, when executed by one or more processors, cause the one or more processors to execute a method of operating a wearable head device comprising an audio system, wherein: the audio system comprises a speaker component, and the speaker component comprises an enclosure, the method comprising: in accordance with a determination that the audio system is operating in a first mode, configuring the enclosure to comprise a sealed enclosure; and in accordance with a determination that the audio system is operating in a second mode, configuring the enclosure to comprise a ported enclosure.

In some embodiments, the method further comprises: in accordance with a determination that the audio system is operating in the first mode, closing a port of the audio system; and in accordance with a determination that the audio system is operating in the second mode, opening the port of the audio system.

In some embodiments, the method further comprises in accordance with a determination that the audio system is operating in the second mode, providing a first audio radiation at a first level in a first direction and a second audio radiation at a second level in a second direction, wherein the second level is lower than the first level.

In some embodiments, the first mode is associated with a first application running on the wearable head device, the second mode is associated with a second application of the wearable head device, the method further comprises determining an application running on the wearable head device, the audio system operates in the first mode in accordance with a determination that the first application is running on the wearable head device, and the audio system operates in the second mode in accordance with a determination that the second application is running on the wearable head device.

In some embodiments, the wearable head device further comprises a digital signal processor (DSP) configured to operate in one or more of a first setting and a second setting, and the method further comprises: in accordance with a determination that the audio system is operating in the first mode, operating the DSP in the first setting; and in accordance with a determination that the audio system is operating in the second mode, operating the DSP in the second setting.

In some embodiments, the wearable head device further comprises a mechanical system, the mechanical system configured to define one or more of the sealed enclosure and the ported enclosure, and the method further comprises: in accordance with the audio system operating in the first mode, defining, with the mechanical system, the sealed enclosure; and in accordance with the audio system operating in the second mode, defining, with the mechanical system, the ported enclosure.

In some embodiments, the wearable head device further comprises a feedback sensor configured to indicate presence of feedback in an environment of the wearable head device, and the method further comprises in response to receiving data, from the feedback sensor, indicating presence of feedback in the environment of the wearable head device, operating the audio system in a third mode.

In some embodiments, the audio system comprises a sliding door, and the sliding door is configured to define the sealed enclosure and the ported enclosure.

In some embodiments, the audio system comprises a ductile plug, and the ductile plug is configured to define the sealed enclosure and the ported enclosure.

In some embodiments, the wearable head device is configured to receive first sensor data and second sensor data, and the method further comprises receiving sensor data, wherein: the audio system is configured to operate in the first mode in response to the device receiving the first sensor data, and the audio system is configured to operate in the second mode in response to the device receiving the second sensor data.

In some embodiments, the method further comprises: operating the audio system in a third mode is associated with a spatial audio associated with a virtual environment of the wearable head device; and in accordance with the audio system operating in the third mode, presenting the spatial audio.

In some embodiments, the method further comprises receiving a signal, the audio system operates in the first mode in accordance with a determination that the signal comprises a first signal, and the audio system operates in the second mode in accordance with a determination that the signal comprises a second signal.

In some embodiments, a non-transitory computer-readable medium stores instructions that, when executed by one or more processors, cause the one or more processors to execute a method of operating a wearable head device comprising an audio system, wherein: the audio system comprises at least one of a port, a dynamic driver, a back volume, a front volume, a tunnel, a funnel, a reflector, and a diffuser, and the method comprises: in accordance with the audio system operating in the first mode, configuring the at least one of the port, the dynamic driver, the back volume, the front volume, the tunnel, the funnel, the reflector, and the diffuser in a first configuration; and in accordance with the audio system operating in the second mode, configuring the at least one of the port, the dynamic driver, the back volume, the front volume, the tunnel, the funnel, the reflector, and the diffuser in a second configuration.

DETAILED DESCRIPTION

Figure 1A:
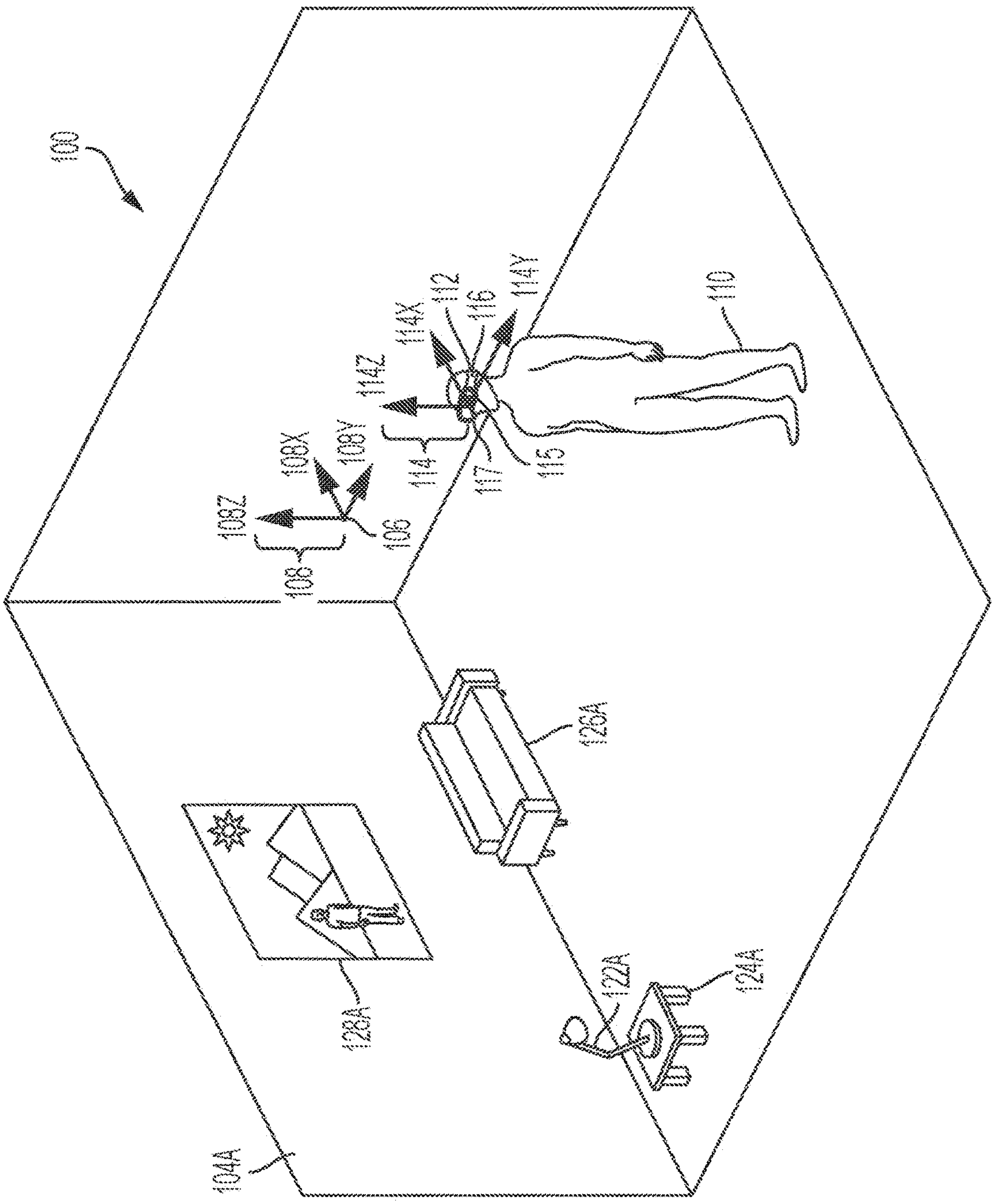
FIGS. 1A-1C illustrate an exemplary mixed reality environment, according embodiments of this disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Like all people, a user of a mixed reality system exists in a real environment—that is, a three-dimensional portion of the "real world." and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display), one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
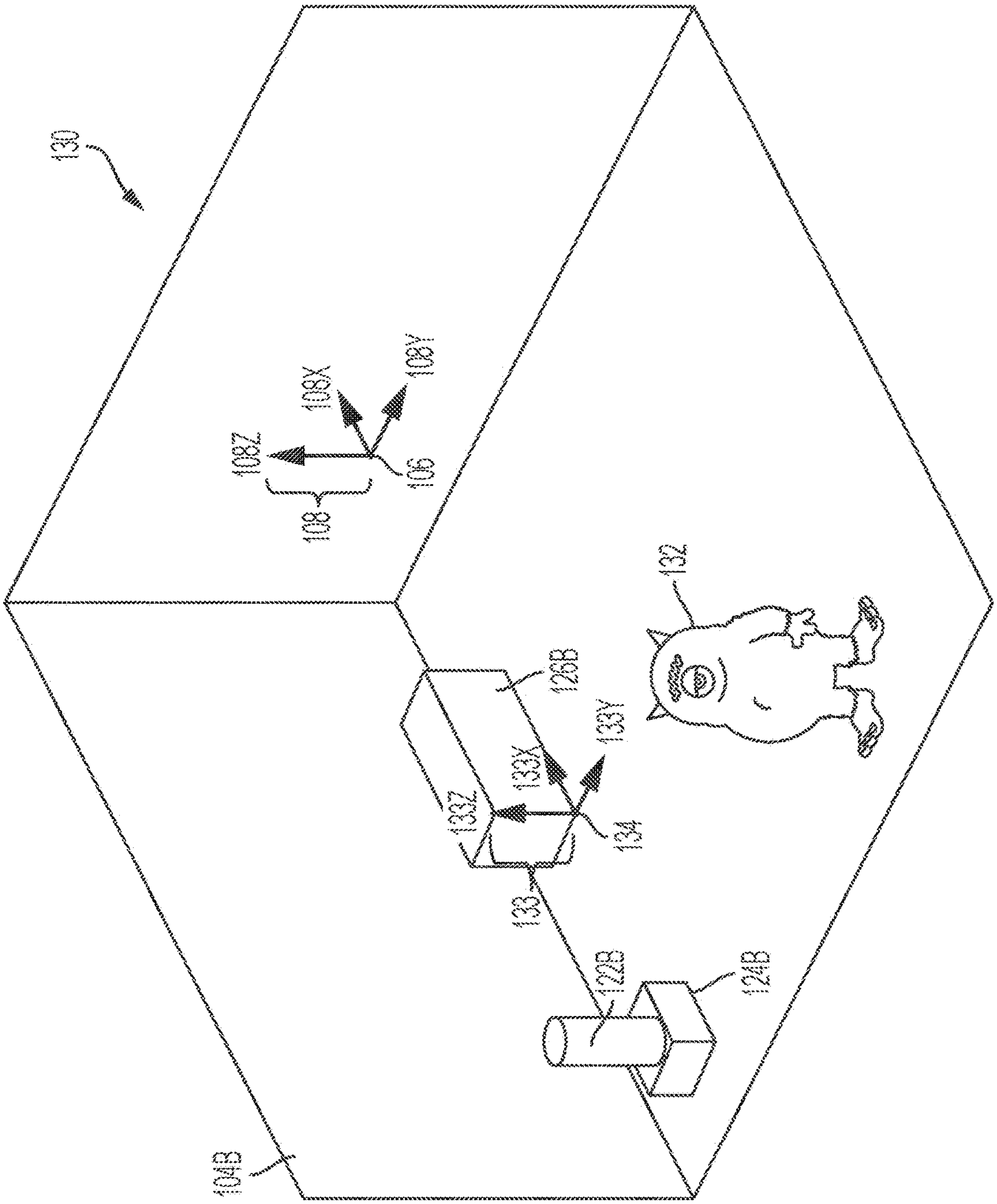

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix, or other rotation matrix), or other suitable representation can characterize a transformation between the persistent coordinate system 133 space and the environment/world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
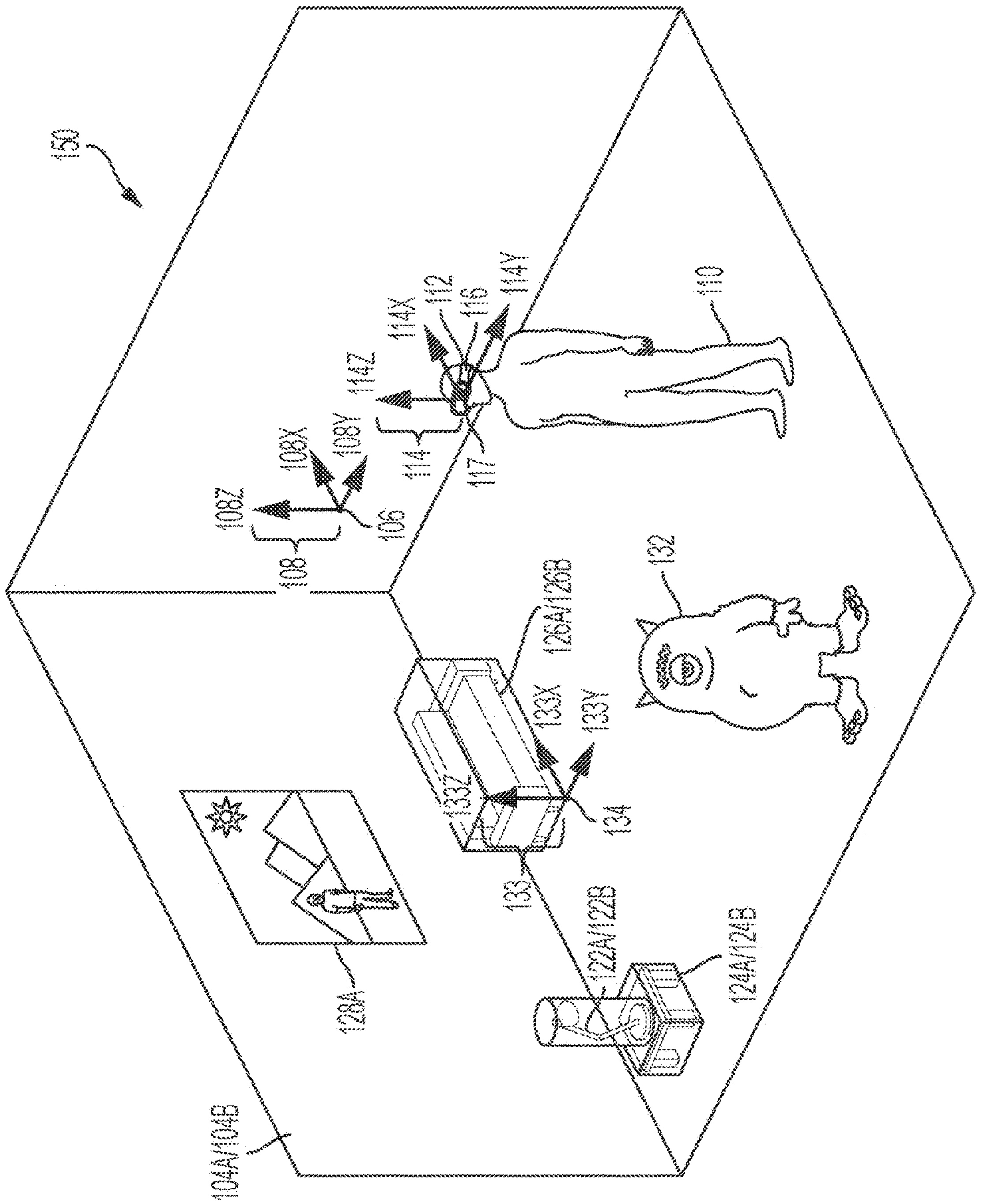

FIG. 1C illustrates an exemplary MRE 150 that simultaneously presents aspects of real environment 100 and virtual environment 130 to user 110 via mixed reality system 112. In the example shown. MRE 150 simultaneously presents user 110 with real objects 122A, 124A, 126A, and 128A from real environment 100 (e.g., via a transmissive portion of a display of mixed reality system 112); and virtual objects 122B. 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (e.g., 122A/122B, 124A/124B. 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual monster 132 could be associated with one or more audio signals, such as a footstep sound effect that is generated as the monster walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic. LIDAR, EOG, GPS, magnetic). In addition, mixed reality system 112 may incorporate networking features (e.g., Wi-Fi capability, mobile network (e.g., 4G, 5G) capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

Figure 2A:
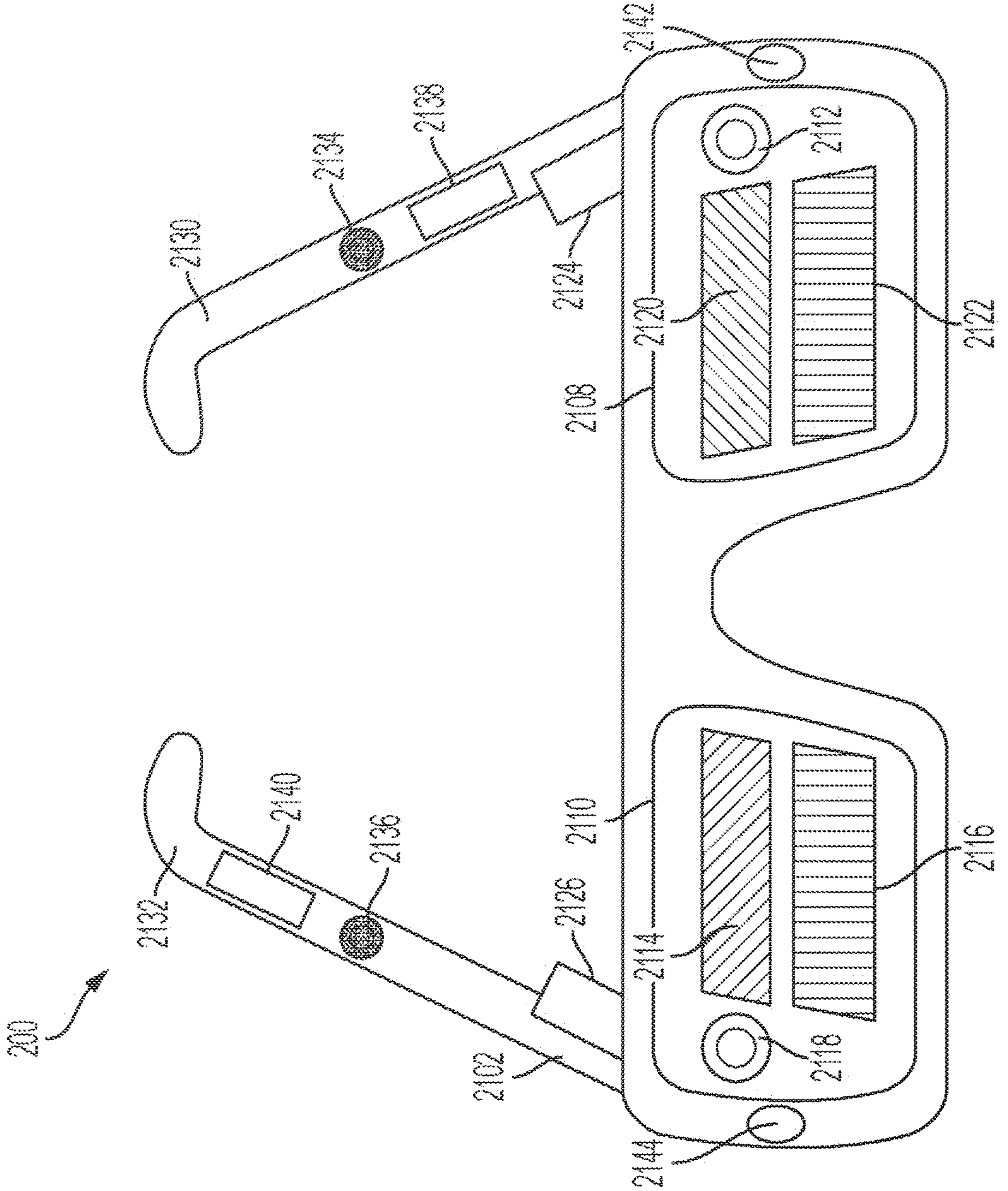
FIGS. 2A-2D illustrate components of an exemplary mixed reality system, according embodiments of this disclosure.
Figure 2B:
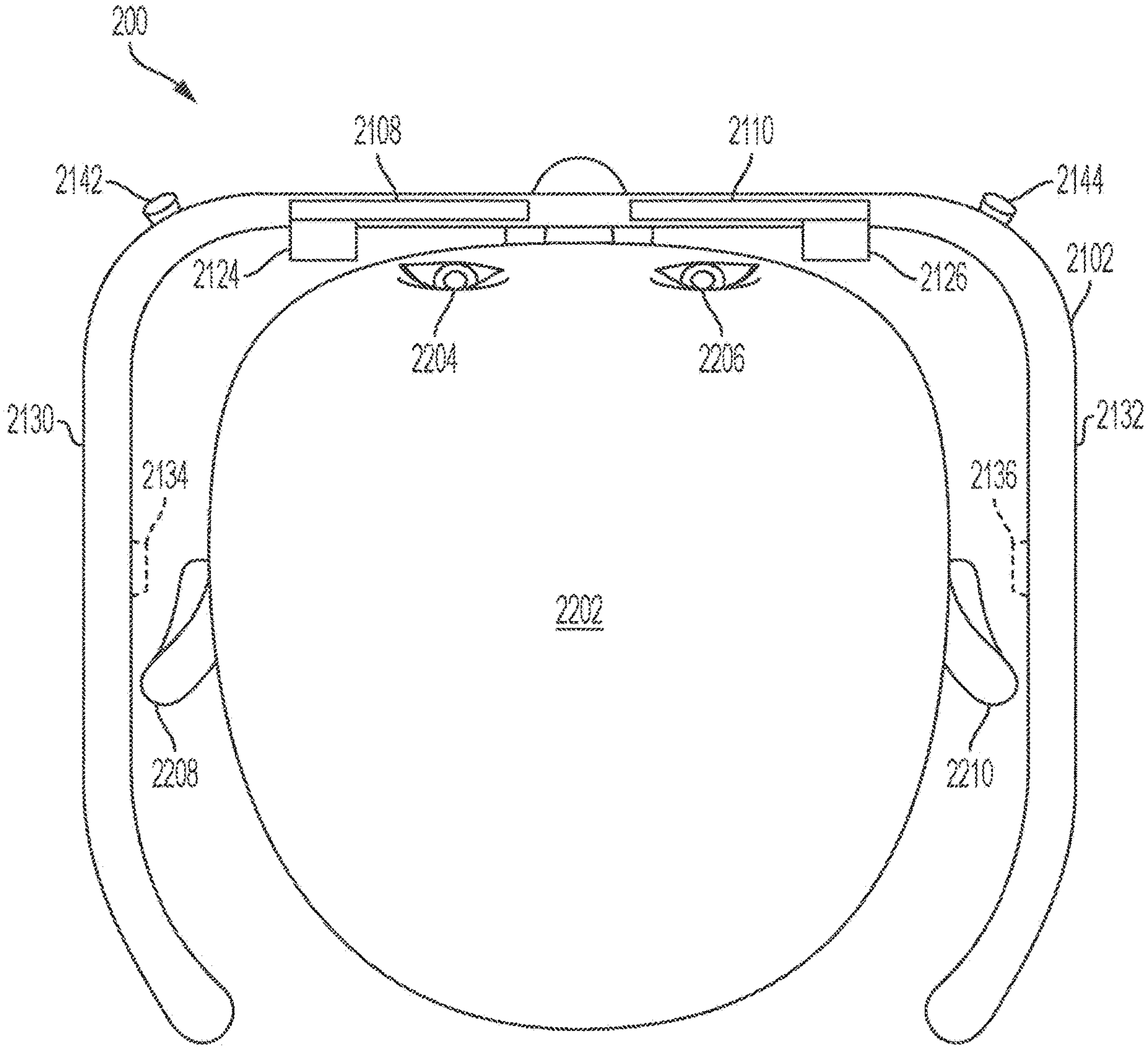
Figure 2C:
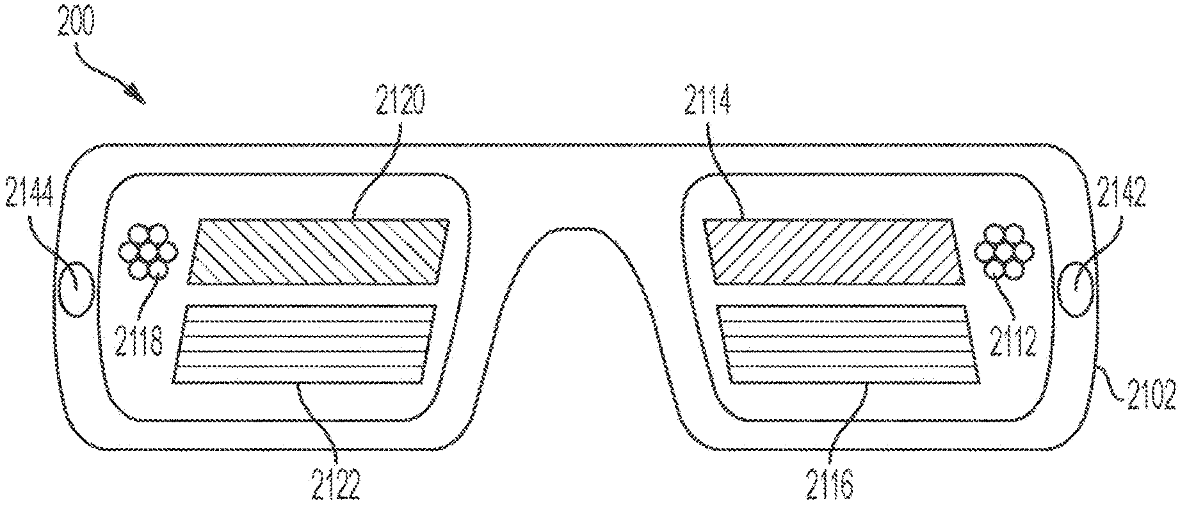
Figure 2D:
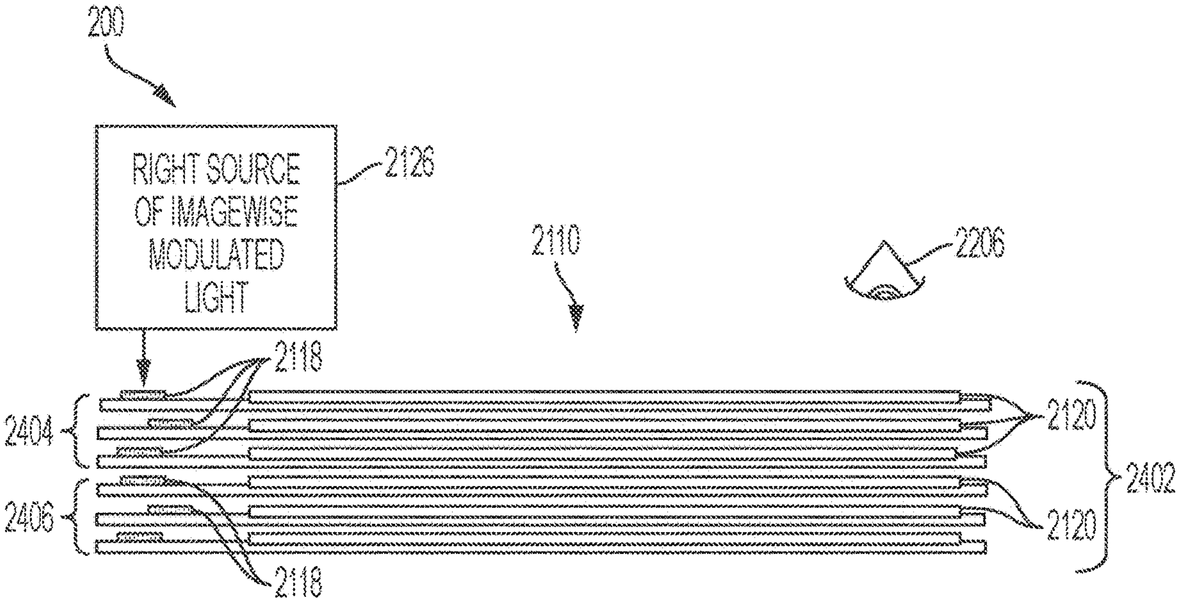

FIGS. 2A-2D illustrate components of an exemplary mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 (e.g., a speaker of an audio system disclosed herein) and the right temple arm 2132 includes a right speaker 2136 (e.g., a speaker of an audio system disclosed herein). An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue, and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. Although not shown in FIG. 2D, the structure of the left eyepiece 2108 may be mirrored relative to the structure of the right eyepiece 2110.

Figure 3A:
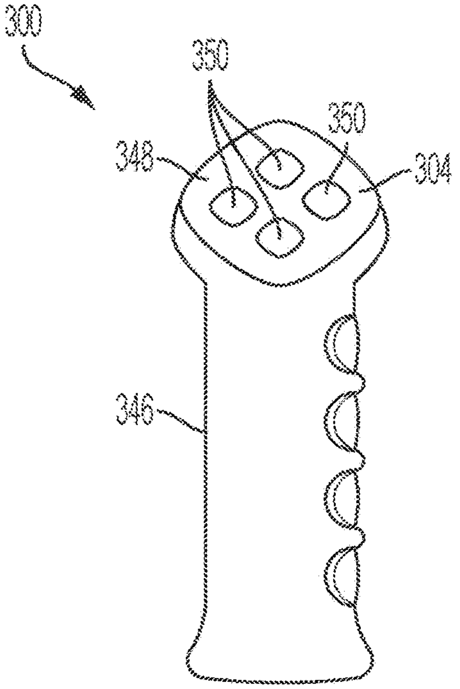
FIG. 3A illustrates an exemplary mixed reality handheld controller, according embodiments of this disclosure.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6 DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
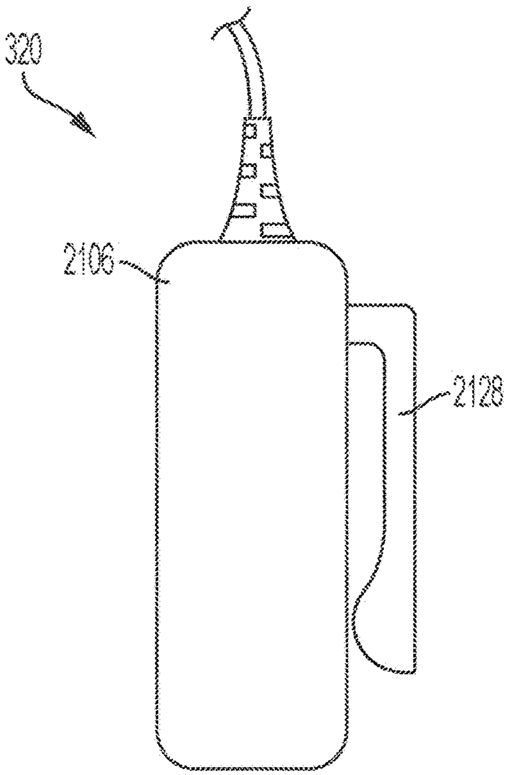
FIG. 3B illustrates an exemplary auxiliary unit, according embodiments of this disclosure.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
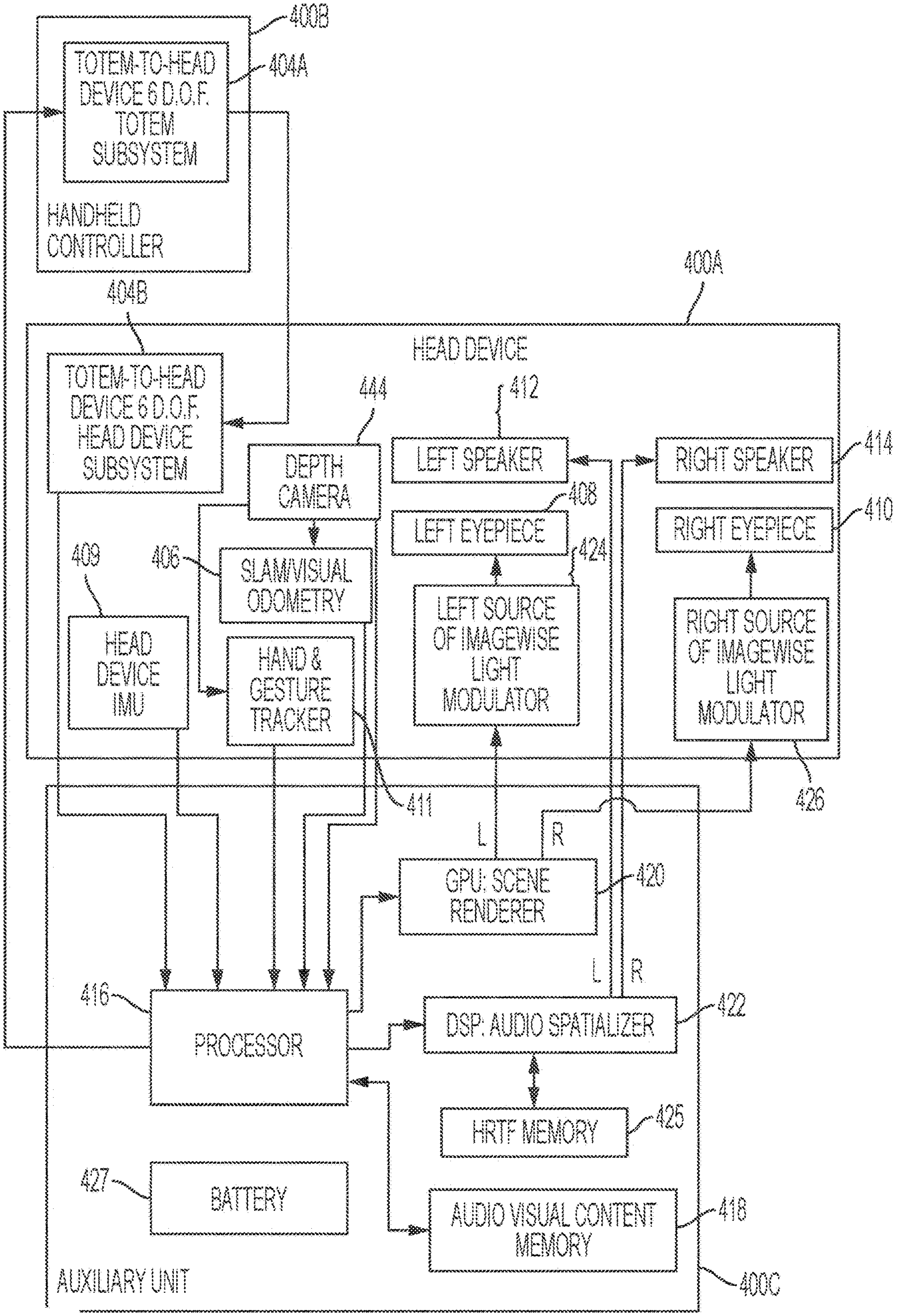
FIG. 4 illustrates an exemplary functional block diagram of an exemplary mixed reality system, according embodiments of this disclosure.

FIG. 4 shows an exemplary functional block diagram that may correspond to an exemplary mixed reality system, such as mixed reality system 200 described herein (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6 DOF) totem subsystem 404A and example wearable head device 400A (which may correspond to wearable head device 2102) includes a totem-to-wearable head device 6 DOF subsystem 404B. In the example, the 6 DOF totem subsystem 404A and the 6 DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6 DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6 DOF of the wearable head device 400A relative to the handheld controller 400B may be determined. Additionally, 6 DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A (e.g., of MR system 112) relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6 DOF headgear subsystem 404B, the IMU 409, the SLAM/visual odometry block 406, depth cameras 444, and/or the hand gesture tracker 411. The processor 416 can also send and receive control signals from the 6 DOF totem system 404A. The processor 416 may be coupled to the 6 DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described herein with respect to FIGS. 2A-2D. The DSP audio spatializer 422 can output audio to a left speaker 412 (e.g., a speaker of an audio system disclosed herein) and/or a right speaker 414 (e.g., a speaker of an audio system disclosed herein). The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example wearable systems 400, various other suitable arrangements of these components will become apparent to those skilled in the art. For example, the headgear device 400A illustrated in may include a processor and/or a battery (not shown). The included processor and/or battery may operate together with or operate in place of the processor and/or battery of the auxiliary unit 400C. Generally, as another example, elements presented or functionalities described with respect to FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

FIGS. 5A-5D and 6A-6D illustrate exemplary speaker components, according to embodiments of this disclosure. In some embodiments, the illustrated speaker components are part of a speaker of wearable head device (e.g., speakers 2134, 2136, 412, 414). In some embodiments. FIGS. 5A-5D and 6A-6D show different design options for implementing the woofer components and tweeter components included in a wearable head device described herein (e.g., MR system 112, MR system 200, wearable head device 400A, wearable head device 800). The depicted design options are not meant to be limiting, but rather to show a few approaches for how woofer and tweeter components may be implemented, using elements such as dynamic drivers, back volumes, front volumes, tunnels and funnels, and reflectors and diffusers. Other approaches and designs may also be effective for implementing the woofer and tweeter components of the present device. For example, it is possible to take separate sound outlets from a woofer component and tweeter component, and merge them into a shared chamber or sound tunnel which has a single sound outlet. In such a case of a shared sound outlet, the woofer and tweeter sound outlets would be considered to be co-located at the position of the shared sound outlet.

In the following discussion, the speaker designs are for the most part "woofer-tweeter agnostic." meaning that any given design (with appropriate choices for size, weight, shape, etc.) can be used to implement either a woofer component or a tweeter component (with some exceptions noted). Therefore, the term "speaker component" in the following discussion is used as a generic term meaning either a woofer component or tweeter component. In each of the examples below, the speaker driver element of the speaker component is illustrated as a type of driver commonly called a dynamic driver. However, other kinds of speaker drivers may also be used, such as piezoelectric drivers, balanced armature drivers, etc. The use of dynamic drivers in the following figures is exemplary only, and not intended to be limiting.

Figure 5A:
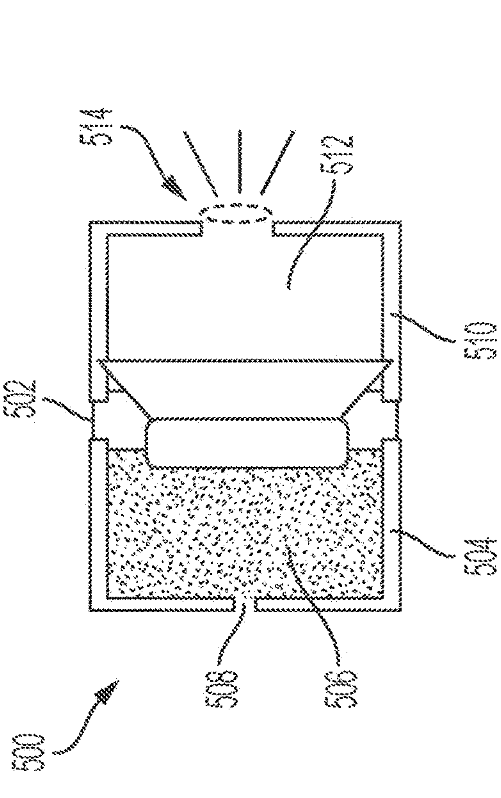
FIGS. 5A-5D illustrate exemplary speaker components, according to embodiments of this disclosure.

FIG. 5A depicts a top-down cross section of speaker component 500 including a speaker driver 502, a back enclosure 504, and a front enclosure 510. The back enclosure 504 encloses air to define a 'back volume' or chamber 506, which is used to improve the performance of sound reproduction hardware. The back enclosure 504 has one or more ports 508, which are openings that allow some movement of air. The front enclosure 510 also encloses air to define a 'front volume' or chamber 512. However in this case the sound is further channeled (e.g., toward the user's ear canal openings) via a sound outlet 514, shown as an opening in the surface of the front enclosure 510.

Figure 5B:
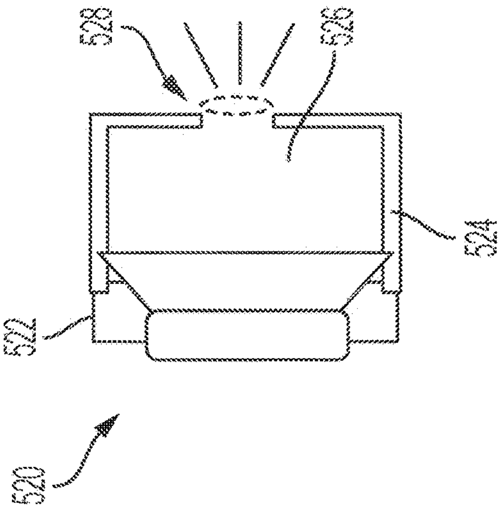

FIG. 5B depicts a top-down cross section of a speaker component 520 which is substantially similar to speaker component 500 of FIG. 5A, except that the back enclosure 504 seen in FIG. 5A is omitted in the speaker component 520 of FIG. 5B.

Figure 5C:
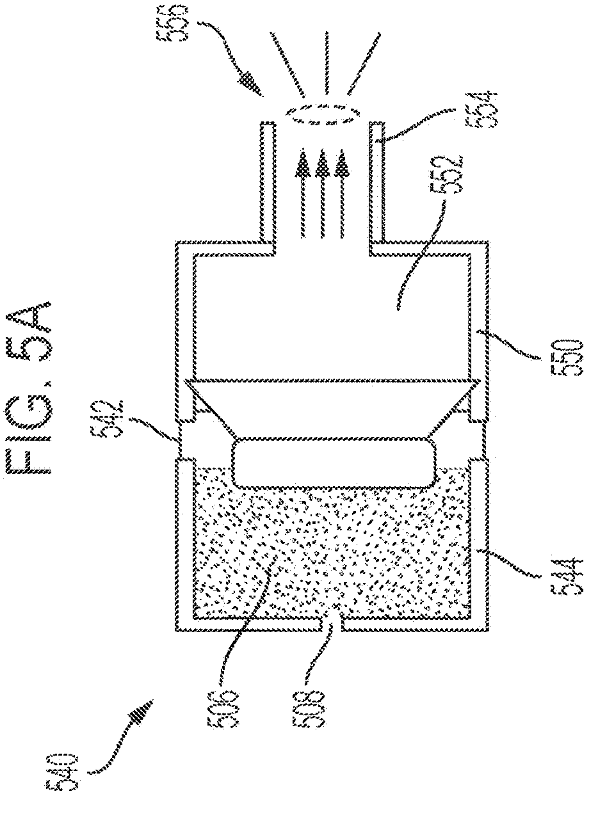

FIG. 5C depicts a top-down cross section of a speaker component 540 including a speaker driver 542, a back enclosure 544, a front enclosure 550, and an acoustic tunnel 554. The back enclosure 544 of FIG. 5C is substantially similar to the back enclosure 504 of FIG. 5A. The front enclosure 550 is largely similar to the front enclosure 510 of FIG. 5A, except that where the latter had an opening forming a sound outlet 514, the former connects to a sound tunnel 554 at the end of which is an opening forming a sound outlet 556. The front enclosure 550 encloses a front volume 552. While the sound tunnel 554 in the diagram is illustrated as being centered to the speaker driver and having an equal width along all of its length, in other cases the specific taper or shape of the sound tunnel can vary significantly, as many different forms and shapes of sound tunnels can be effective for channeling sound.

Figure 5D:
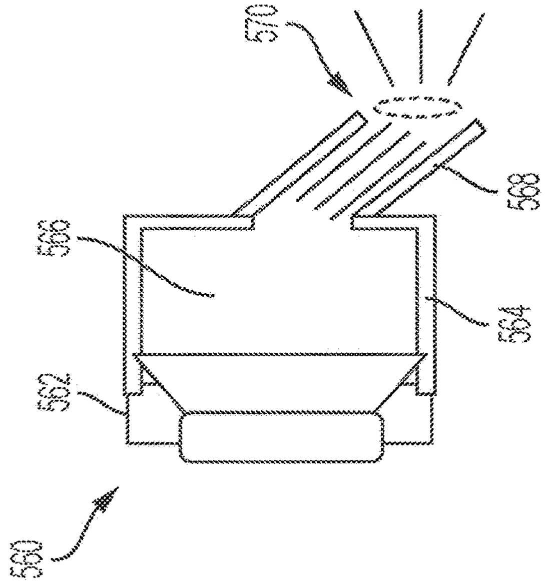

FIG. 5D depicts a top-down cross section of a speaker component 560 which is similar to speaker component 540 of FIG. 5C, except that the back enclosure 544 seen in FIG. 5C is omitted in the speaker component 560 of FIG. 5D. The speaker component 560 includes a driver 562 facing into a front enclosure 564. A sound tunnel 568 is offset with respect to a common axis of the driver 562, 564 and extending at an angle to the aforementioned common axis. The sound tunnel 568 can also be tapered. Different forms and shapes of sound tunnels can be effective for channeling sound out of the front enclosure 564.

Figure 6B:
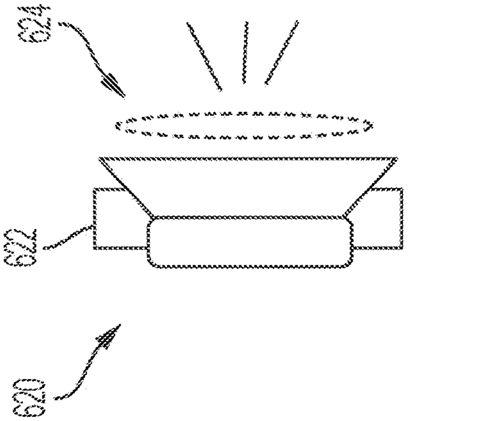
FIGS. 6A-6D illustrate exemplary speaker components, according to embodiments of this disclosure.
Figure 6D:
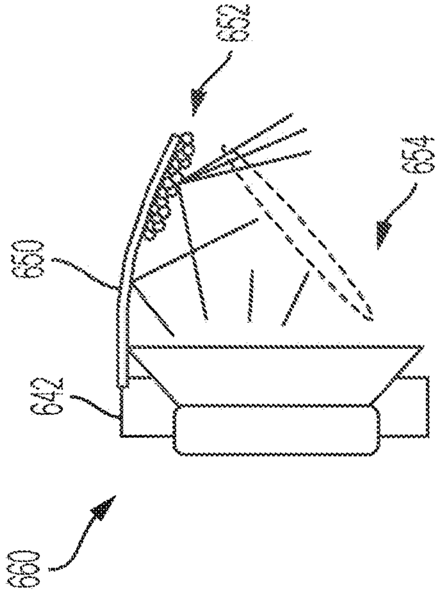
Figure 6A:
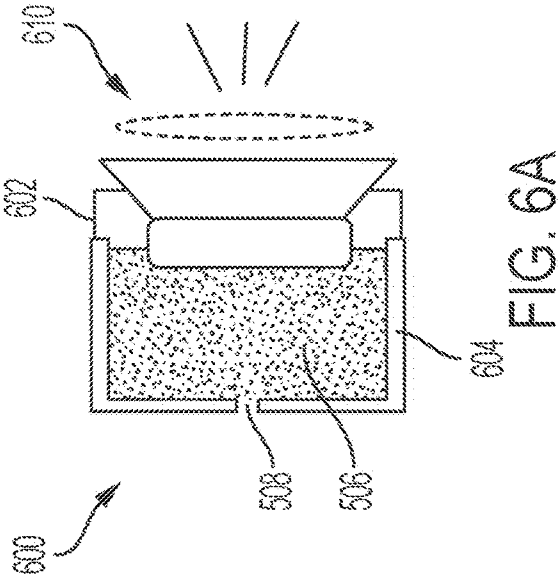

FIGS. 6A-6D illustrate exemplary speaker components, according to embodiments of this disclosure. In some embodiments, the illustrated speaker components are part of a speaker of wearable head device (e.g., speakers 2134, 2136, 412, 414). FIG. 6A depicts a top-down cross section of a speaker component 600 including a direct-radiating speaker driver 602, and a back enclosure 604. The back enclosure 604 of FIG. 6A is substantially similar to the back enclosure 504 of FIG. 5A. The direct-radiating speaker driver 602 disperses sound directly into the air (notwithstanding any "acoustically transparent" material that may cover the speaker for protection or cosmetics) from the surface of the diaphragm. As such, a direct-radiating driver can be said to have a sound outlet 610 that is approximately coextensive with the circumference of the surface of the diaphragm.

FIG. 6B depicts a top-down cross section of a speaker component 620 which is substantially similar to speaker component 600 of FIG. 6A, except that the back enclosure 604 seen in FIG. 6A is omitted in the speaker component 620 of FIG. 6B.

Figure 6C:
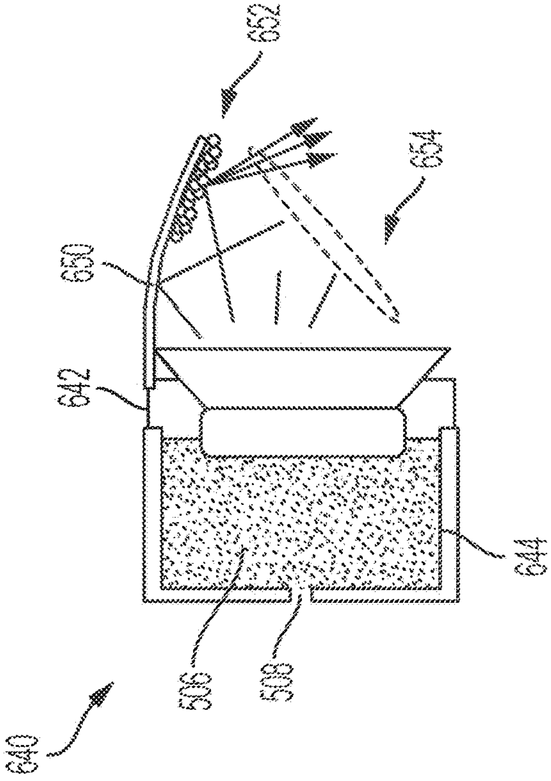

FIG. 6C depicts a top-down cross section of a speaker component 640 including a direct-radiating speaker driver 642, a back enclosure 644, a sound-reflecting surface 650, and a sound-softening diffusor 652. The back enclosure 644 of FIG. 6C is substantially similar to the back enclosure 504 of FIG. 5A. In this example, the sound-reflecting surface 650 is shown in cross section like the rest of the elements, so it cannot be clearly seen that it is "cupping" the sound to go in a particular direction (as would be readily apparent if FIG. 6C were drawn in three dimensions). The sound outlet 654 for the speaker component 640 is located in a position that reflects this "cupping"; it is located where the speaker driver 642 and the attached sound-reflecting surface 650 would form a kind of "opening" if viewed in three dimensions. In addition, a portion of the sound-reflecting surface 650 is used to mount an optional sound-softening diffusor 652, which somewhat randomizes the directionality of the outputted sound waves (to make them sound less "brittle" and more "diffuse").

FIG. 6D depicts a top-down cross section of a speaker component 660 which is substantially similar to speaker component 640 of FIG. 6C, except that the back enclosure 644 seen in FIG. 6C is omitted in the speaker component 660 of FIG. 6D.

Figure 7:
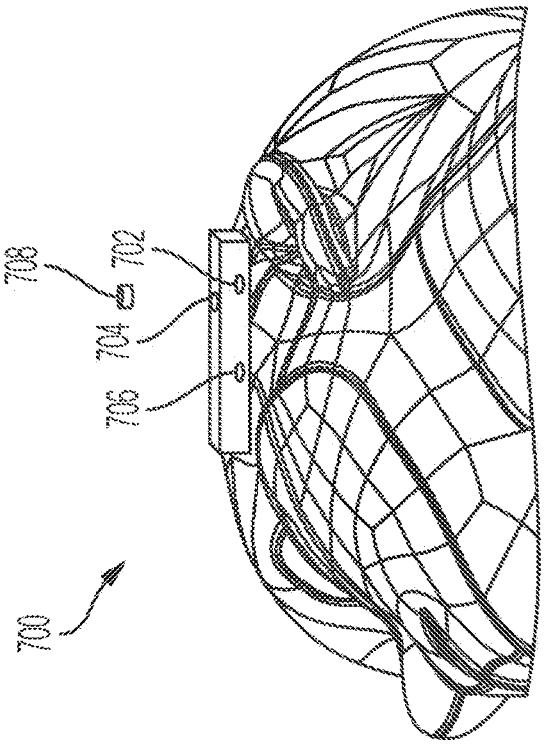
FIG. 7 illustrates an exemplary audio system, according to embodiments of this disclosure.

FIG. 7 illustrates an exemplary audio system 700, according to embodiments of this disclosure. In some embodiments, the exemplary audio system 700 is included in a wearable head device disclosed herein (e.g., MR system 112. MR system 200, wearable head device 400A, wearable head device 800). In some embodiments, the exemplary audio system 700 is configurable to operate in different modes. For example, the audio system 700 includes speaker components described with respect to FIGS. 5A-5D and 6A-6D, and the audio system 700 can configure elements of the speaker components to cause the audio system to operate in the different modes. As an example, speaker component elements such as port, dynamic drivers, back volumes, front volumes, tunnels, funnels, reflectors, and/or diffusers can be configured by the audio system 700 to cause the audio system to operate in the different modes.

For example, in a first mode, the audio system configures the speaker component elements in a first configuration and causes audio be presented in a first manner (e.g., at a first radiation level, at a first radiation pattern). In a second mode, the audio system configures the speaker component elements in a second configuration and causes audio to be presented in a second manner (e.g., at a second radiation level, at a second radiation pattern).

As an exemplary advantage, the audio system 700 allows a wearable head device to optimize user experience by being able to present audio in different modes of operation depending on the application. For example, the wearable head device may be running an application for a user in a private space (e.g., music playing application, move playing application, gaming application), and privacy and/or disturbance may not be a concern. The audio system 700 may be configured in a first mode to provide higher sound levels (e.g., for lower sound excursion) to optimize the experience of the entertainment application. As another example, the wearable device may be running an application in a public space (e.g., audio conferencing application, video conferencing application, mixed reality conferencing application), and privacy and/or disturbance may be a concern. The audio system 700 may be configured in a second mode to provide controlled sound radiation patterns to direct the audio presentation to the user to improve privacy and/or reduce disturbance. As yet another example, multiple wearable head devices may be used in a same space (e.g., in a mixed reality environment including multiple users, in an operating room including multiple users), and audio interference (e.g., feedback) and/or disturbance between devices may be a concern. The audio system 700 may be configured in a third mode to reduce audio interference (e.g., feedback, feedback detected using a sensor of the wearable head device) and/or disturbance between devices to improve audio clarity for each respective device.

In some embodiments, the audio system 700 configures speaker component elements such as port, dynamic drivers, back volumes, front volumes, tunnels, funnels, reflectors, and/or diffusers to cause the audio system to operate in the different modes. Depending on an application, the audio system 700 allows a wearable head device to optimize user experience by being able to present audio in different modes of operation.

For example, the audio system 700 includes one or more of a first port 702, a second port 704, and a third port 706. The first port 702 may be an acoustic port on an interior of a temple frame of a wearable head device. The second port 704 may be a secondary acoustic port on an exterior of a frame of the wearable head device opposing the first port 702. The third port 706 may be a tuning port on the frame of the wearable head device. The audio system 700 can configure at least one of the ports to cause audio to be presented in different modes.

It is understood that the locations and the numbers of the ports are merely exemplary. In some embodiments, the ports are located proximate to drivers to reinforce an output sound pressure level (e.g. front port, tapped horn design). In some embodiments, the ports are placed in an area to produce a controlled (e.g., cardioid) radiation pattern, for situations where radiation control is required or desired (e.g., to provide more privacy, to reduce interference).

For example, at least one of the first port 702, second port 704, and third port 706 may be configured to achieve a desired sound radiation pattern and/or level suitable for a particular application. As a specific example, the second port 704 may be configured to achieve the desired sound radiation pattern and/or level suitable for the particular application. In a first mode, the audio system may configure the second port 704 in a first configuration and causes audio be presented in a first manner (e.g., at a first radiation level, at a first radiation pattern). For example, in the first mode, the second port 704 is closed by the audio system 700, forming a sealed enclosure in a corresponding speaker component of the audio system 700 and allowing higher sound levels to be provided and optimizing the experience of an associated application (e.g., when privacy, interference, and/or disturbance is not a concern). In a second mode, the audio system may configure the second port 704 in a second configuration and causes audio to be presented in a second manner (e.g., at a second radiation level, at a second radiation pattern). For example, in the second mode, the second port 704 is open by the audio system 700, forming a ported enclosure in a corresponding speaker component of the audio system 700 and allowing controlled sound radiation patterns to be provided (e.g., to direct the audio presentation to a user, lower radiation levels are generated in directions where audio is less desired) and optimizing the experience of an associated application (e.g., when privacy, interference, and/or disturbance is a concern).

In some embodiments, the audio system 700 includes a ductile plug 708, and the ductile plug 708 is used to configure the audio system 700 to operate in different modes. For example, in a first mode, the second port 704 is closed by the ductile plug 708 (e.g., applied (e.g., controlled by a motor or other electro-mechanical system) by the audio system 700, applied manually by a user), forming a sealed enclosure in a corresponding speaker component of the audio system 700 (e.g., by impeding airflow on the second port 704) and allowing higher sound levels to be provided and optimizing the experience of an associated application (e.g., when privacy, interference, and/or disturbance is not a concern). In a second mode, the second port 704 is open (e.g., by removing the ductile plug 708 from the second port 704 (e.g., by the audio system 700 (e.g., controlled by a motor or other electro-mechanical system), manually by a user)), forming a ported enclosure in a corresponding speaker component of the audio system 700 (e.g., by allowing airflow through the second plug 704) and allowing controlled sound radiation patterns to be provided (e.g., to direct the audio presentation to a user, lower radiation levels are generated in directions where audio is less desired) and optimizing the experience of an associated application (e.g., when privacy, interference, and/or disturbance is a concern).

Although the ductile plug 708 is illustrated as being separated from the audio system 700, it is understood that the illustration is merely exemplary. The ductile plug may be located at different locations of the audio system 700 (e.g., attached to the audio system 700 near an associated port).

In some embodiments, the audio system 700 includes a sliding door (not shown), and the sliding door is used to configure the audio system 700 to operate in different modes. The sliding door may be located proximate to a corresponding port that the sliding door is configured to open or close. For example, in a first mode, the second port 704 is closed by the sliding door (e.g., applied (e.g., controlled by a motor or other electro-mechanical system) by the audio system 700, applied manually by a user), forming a sealed enclosure in a corresponding speaker component of the audio system 700 (e.g., by impeding airflow on the second port 704) and allowing higher sound levels to be provided and optimizing the experience of an associated application (e.g., when privacy, interference, and/or disturbance is not a concern). In a second mode, the second port 704 is open (e.g., by opening the sliding door (e.g., by the audio system 700 (e.g., controlled by a motor or other electro-mechanical system), manually by a user)), forming a ported enclosure in a corresponding speaker component of the audio system 700 (e.g., by allowing airflow through the second plug 704) and allowing controlled sound radiation patterns to be provided (e.g., to direct the audio presentation to a user, lower radiation levels are generated in directions where audio is less desired) and optimizing the experience of an associated application (e.g., when privacy, interference, and/or disturbance is a concern).

In some embodiments, the audio system 700 operates in a particular mode depending on the particular application. In some embodiments, the audio system 700 or the wearable head device including the audio system (e.g., MR system 112, MR system 200, wearable head device 400A, wearable head device 800) determines an application of the wearable head device. In accordance with a determination that the application is a first application, the audio system 700 operates in a first mode. In accordance with a determination that the application is a second application, the audio system 700 operates in a second mode.

For example, the wearable head device determines that the application is an application that does not require privacy, reduced interference, or reduced disturbance. The wearable head device may make this determination based on at least one of sensor data from a sensor of the wearable head device (e.g., location data, environment data), user input (e.g., user preference), and application data (e.g., type of application). In accordance with the determination that the application is an application that does not require privacy, reduced interference, or reduced disturbance, the audio system is configured to operate in a first mode (e.g., a port of the audio system operates in a closed state, as described herein, to provide higher audio radiation levels).

As another example, the wearable head device determines that the application is an application that requires privacy, reduced interference (e.g., feedback), or reduced disturbance. The wearable head device may make this determination based on at least one of sensor data from a sensor of the wearable head device (e.g., location data, environment data, audio environment data, feedback data), user input (e.g., user preference), and application data (e.g., type of application). In accordance with the determination that the application is an application that requires privacy, reduced interference (e.g., feedback), or reduced disturbance, the audio system is configured to operate in a second mode (e.g., a port of the audio system operates in an open state, as described herein, to provide controlled audio radiation).

In some embodiments, the operations of audio system 700 can be adjusted programmatically. For example, when providing a spatialized audio stream (e.g., associated with a spatialized virtual sound in a mixed reality environment), the wearable head device or the audio system 700 provides a control signal that reconfigures, as disclosed herein, the dimensions and characteristics of an element of the audio system (e.g., ports, volumes, tunnels, funnels, etc.) based on the spatialized audio signal. The control signal can be based on the audio signal (e.g., the frequency spectrum of the signal), or on input from the sensors of the AR device (e.g., camera input. LIDAR or sonar measurements of the mixed reality environment, etc.).

In some embodiments, the audio system 700 receives a software-generated signal, and the audio system 700 operates in a mode based on the received signal. For example, an application can be configured to cause a signal to be generated (e.g., by a processor of the wearable head device) in accordance with a determination that the audio system should present audio having certain characteristics (e.g., to emphasize or de-emphasize certain frequencies based on the user's position in a virtual environment, to increase privacy, to reduce interference, to reduce disturbance). For example, the signal can be generated automatically based on events occurring in the virtual environment, by a user's position or orientation in the virtual environment, or by spectral analysis of an audio signal to be presented to the user. As another example, the signal can be generated automatically based on an environment of the wearable device (e.g., the privacy of the setting, a likelihood of causing interference or disturbance). The software-generated signal can specify a value that corresponds to a configuration of the audio system (e.g., position of a sliding door, a port status (e.g., open, closed, partially closed), position of a plug, acoustic volume dimension) and causes the audio system to be configured accordingly.

In some embodiments, the modes of the audio system 700 are associated with various audio settings. For example, in a first mode, the audio system 700 may cause a processor (e.g., DSP 408) of a wearable head device including the audio system to be in a first setting (e.g., processing an audio to be presented using a first operation, applying first filters to an audio to be presented). In a second mode, the audio system 700 may cause the processor (e.g., DSP 408) of the wearable head device to be in a second setting (e.g., processing an audio to be presented using a second operation, applying second filters to an audio to be presented).

Although the audio system 700 is described as operating in two different modes and using a ductile plug or a sliding door for configuring a port of the audio system to operate in the two different modes, it is understood that the descriptions are merely exemplary. The audio system 700 may operate in other modes of audio presentation, and other elements and methods may be used to configure one or more elements of the audio system to operate in the different modes. For example, in a third mode, the port is partially closed. As another example, other ports of the audio system (e.g., first port 702, third port 706) may be alternatively or additionally configured (e.g., open, close, partially closed) to operate the audio system in different modes. As yet another example, a different element or mechanism (e.g., other than a ductile plug or a sliding door) is used to configure a port of the audio system to operate in different modes.

Although configuration of the audio system 700 is described with respect to ports of the system, it is understood that the described configurations are merely exemplary. Other configurations of the audio system corresponding to different modes of audio presentation may exist without departing from the scope of the disclosure. For example, speaker component elements such as dynamic drivers, back volumes, front volumes, tunnels, funnels, reflectors, and/or diffusers can be alternatively or additionally configured (e.g., the dimensions and/or the characteristics of at least one of these elements are changed by the audio system) by the disclosed audio system to cause the audio system to operate in the different modes and achieve a desired sound radiation pattern and/or level suitable for a particular application.

In some embodiments, generally, the different modes correspond to different configurations of these elements to create different audio presentation characteristics (e.g., radiation patterns, frequency responses). For example, the different modes can refer to different acoustic volume dimensions, port statuses (e.g., open, closed, partially closed), sliding door positions, plug positions, driver strengths, and filter responses.

Although the audio system 700 is described with respect to specific location of a wearable head device, it is understood that the descriptions are merely exemplary. Other locations of the audio system may be included without departing from the scope of the disclosure. For example, the audio system includes similar configurations on an opposing side of the wearable head device. As another example, the audio system includes similar configurations on a different location of the wearable head device (e.g., corresponding to a different audio channel).

Figure 8:
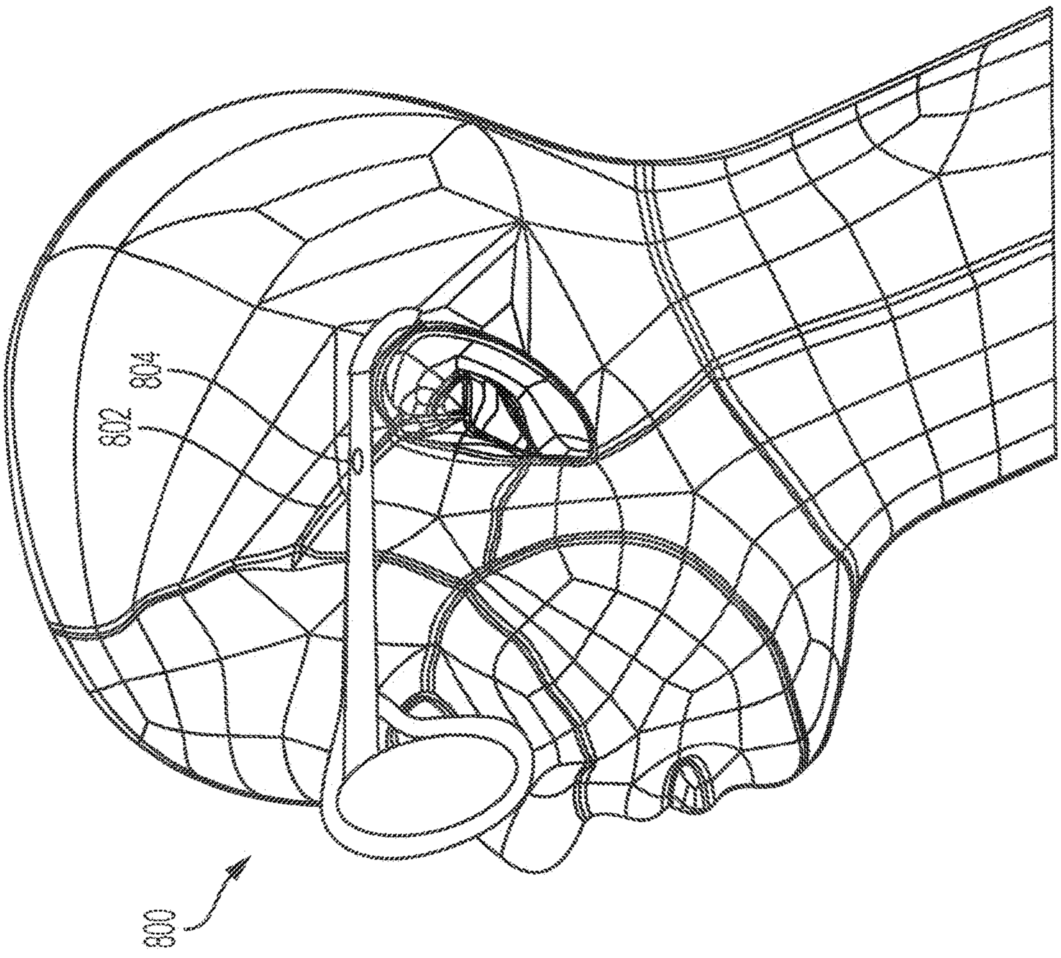
FIG. 8 illustrates an exemplary wearable head device, according to embodiments of this disclosure.

FIG. 8 illustrates an exemplary wearable head device 800, according to embodiments of this disclosure. In some embodiments, the wearable head device 800 is at least one of MR system 112. MR system 200, and wearable head device 400A. In some embodiments, the wearable head device 800 includes audio system 802 and port 804. The audio system 802 may be audio system 700, and the port may be second port 704. For the sake of brevity, some elements, operations, and advantages associated with audio system 700 that are included in wearable head device 800 are not described here.

As an exemplary advantage, the wearable head device 800 optimizes user experience by being able to present audio in different modes of operation depending on the application. For example, the wearable head device 800 may be running an application for a user in a private space (e.g., music playing application, move playing application, gaming application), and privacy and/or disturbance may not be a concern. The audio system of the wearable head device 800 may be configured in a first mode to provide higher sound levels (e.g., for lower sound excursion) to optimize the experience of the entertainment application. As another example, the wearable device 800 may be running an application in a public space (e.g., audio conferencing application, video conferencing application, mixed reality conferencing application), and privacy and/or disturbance may be a concern. The audio system of the wearable head device 800 may be configured in a second mode to provide controlled sound radiation patterns to direct the audio presentation to the user to improve privacy and/or reduce disturbance. As yet another example, multiple wearable head devices 800 may be used in a same space (e.g., in a mixed reality environment including multiple users, in an operating room including multiple users), and audio interference (e.g., feedback) and/or disturbance between devices may be a concern. The audio system of the wearable head device 800 may be configured in a third mode to reduce audio interference (e.g., feedback, feedback detected using a sensor of the wearable head device) and/or disturbance between devices to improve audio clarity for each respective device.

In some embodiments, the port 804 comprises an acoustic mesh. The acoustic mesh may cover the port 804. In some embodiments, the acoustic mesh comprises a RPD Reverse Plain Dutch Weave. In some embodiments, the acoustic mesh has a Multiplex Twilled Weave comprising 2-5 bonded fibers or wires. In some embodiments, the acoustic mesh comprises a property of monofilament material. In some embodiments, the acoustic mesh comprises a micronic acoustic mesh. The micronic acoustic mesh may have a Dutch Twill weave pattern or a Dutch Plain Weave pattern. In some embodiments, the micronic acoustic mesh comprises a Polyester property, a Polyimide property, a Polypropylene property, a Polyamide property, a Nylon property, or a meta-aramid property.

Figure 9:
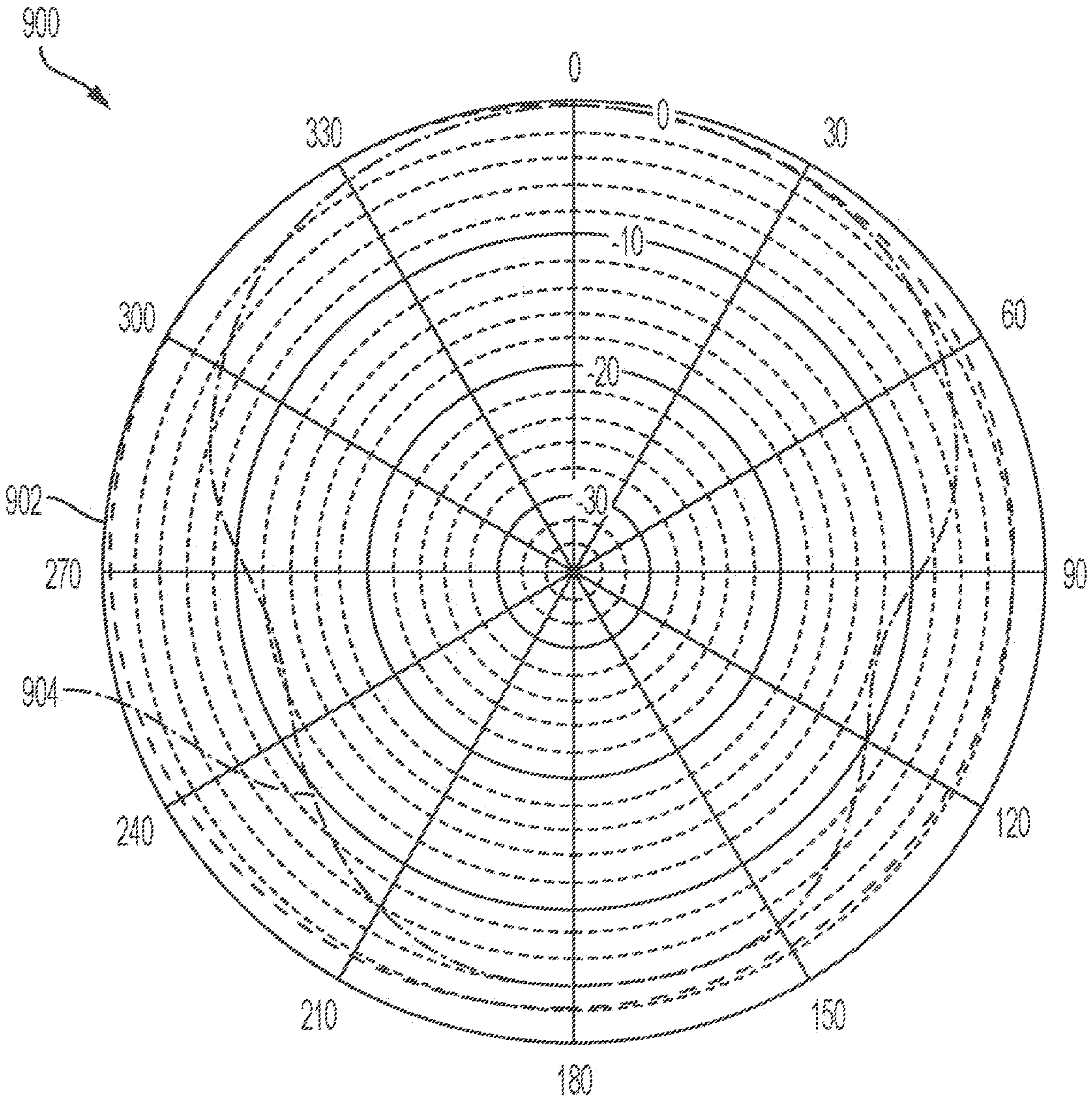
FIG. 9 illustrates an exemplary polar directivity plot of an exemplary audio system, according to embodiments of this disclosure.

FIG. 9 illustrates an exemplary polar directivity plot 900 of an exemplary audio system, according to embodiments of this disclosure. The polar directivity plot 900 may illustrate levels of audio radiation (e.g., in dB) in different directions (e.g., in degrees) relative to a speaker component associated with different modes of operation. For example, the curve 902 is a polar directivity plot associated with a first mode, and the curve 904 is a polar directivity plot associated with a second mode.

For example, in the first mode, a sealed enclosure may be formed (e.g., as described with respect to FIG. 7) in a speaker component of an audio system (e.g., audio system 700), allowing higher sound levels to be provided, as illustrated with the curve 902. In the first mode, the audio system 700 may optimize the experience of an associated application when privacy, interference, and/or disturbance is not a concern. In the second mode, a ported enclosure may be formed (e.g., as described with respect to FIG. 7) in a speaker component of the audio system 700, allowing controlled sound radiation patterns to be provided (e.g., to direct the audio presentation to a user, lower radiation levels are generated in directions where audio is less desired). In the second mode, the audio system 700 may optimize the experience of an associated application when privacy, interference, and/or disturbance is a concern.

Figure 10:
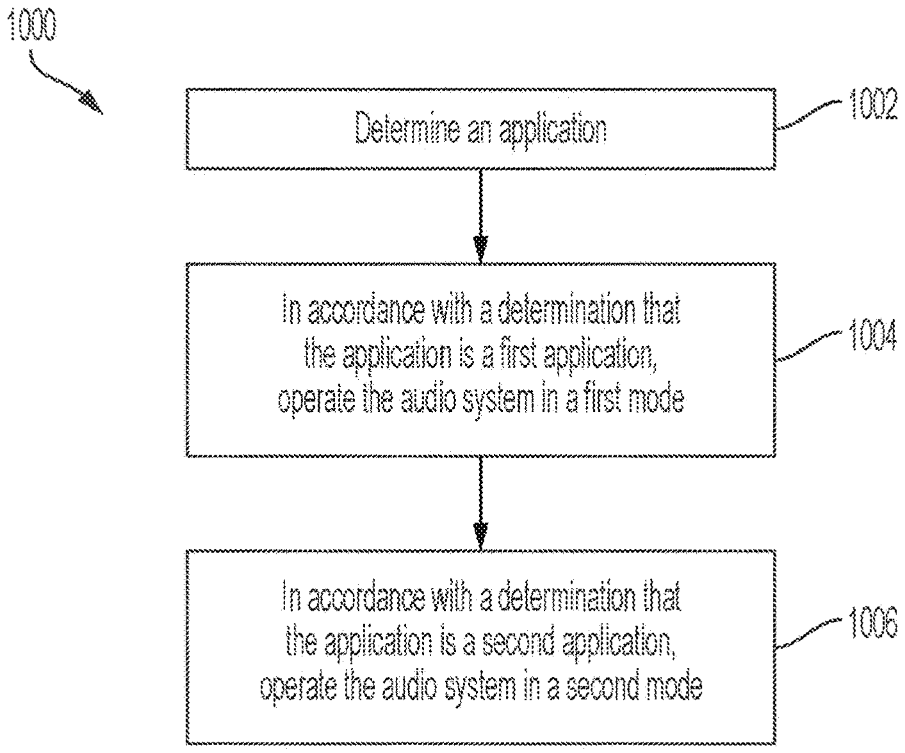
FIG. 10 illustrates an exemplary method of operating an exemplary audio system, according to embodiments of this disclosure.

FIG. 10 illustrates an exemplary method 1000 of operating an exemplary audio system, according to embodiments of this disclosure. Although the method 1000 is illustrated as including the described steps, it is understood that different order of step, additional step, or less step may be included without departing from the scope of the disclosure. Steps of method 1000 may be performed with steps of method 1100. In some embodiments, the method 1000 is performed with at least one of MR system 112. MR system 200, wearable head device 400A, audio system 700, and wearable head device 800. For the sake of brevity, some elements and advantages associated with these systems are not repeated here.

In some embodiments, the method 1000 includes determining an application (step 1002). For example, as described with respect to FIGS. 7-9, a wearable device (e.g., MR system 112, MR system 200, wearable head device 400A, wearable head device 800) determines an application that it is currently running.

In some embodiments, the method 1000 includes in accordance with a determination that the application is a first application, operating the audio system in a first mode (step 1004). For example, as described with respect to FIGS. 7-9, the wearable head device (e.g., MR system 112, MR system 200, wearable head device 400A, wearable head device 800) determines that the wearable head device is currently running a first application (e.g., an application determined to not require privacy, reduced interference (e.g., feedback), or reduced disturbance). In accordance with the determination, the wearable head device operates an audio system (e.g., audio system 700) in a first mode, as described with respect to FIGS. 7-9. For example, operating the audio system in the first mode includes forming a sealed enclosure in a speaker component of the audio system. For the sake of brevity, some elements and advantages associated with this step that were described are not repeated here.

In some embodiments, the method 1000 includes in accordance with a determination that the application is a first application, operating the audio system in a first mode (step 1006). For example, as described with respect to FIGS. 7-9, the wearable head device (e.g., MR system 112. MR system 200, wearable head device 400A, wearable head device 800) determines that the wearable head device is currently running a second application (e.g., an application determined to require privacy, reduced interference (e.g., feedback), or reduced disturbance). In accordance with the determination, the wearable head device operates an audio system (e.g., audio system 700) in a second mode, as described with respect to FIGS. 7-9. For example, operating the audio system in the second mode includes forming a ported enclosure in a speaker component of the audio system. For the sake of brevity, some elements and advantages associated with this step that were described are not repeated here.

Figure 11:
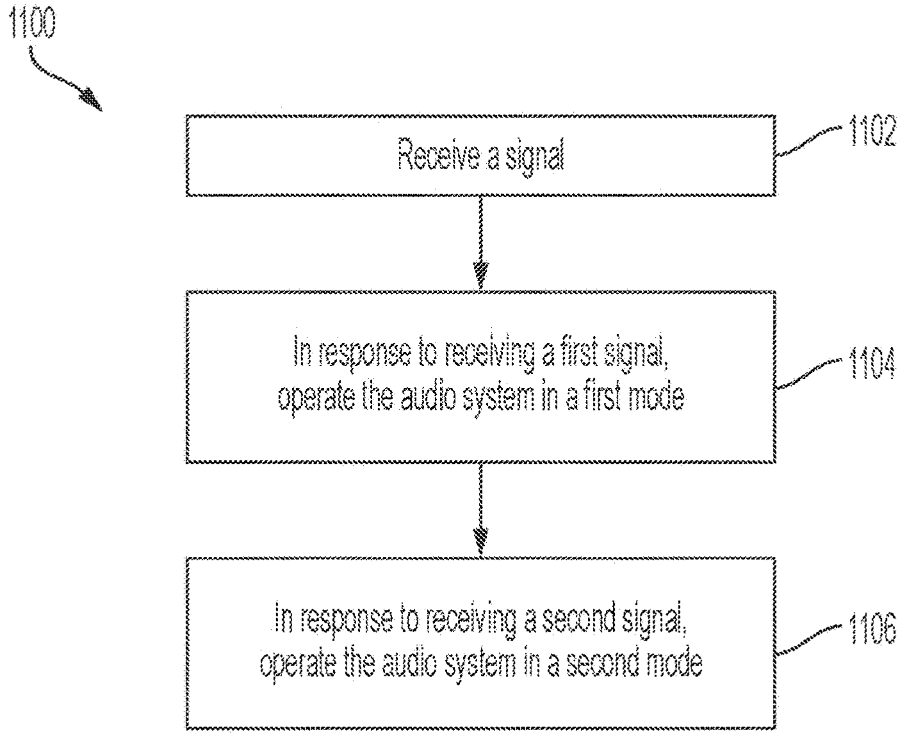
FIG. 11 illustrates an exemplary method of operating an exemplary audio system, according to embodiments of this disclosure.

FIG. 11 illustrates an exemplary method 1100 of operating an exemplary audio system, according to embodiments of this disclosure. Although the method 1100 is illustrated as including the described steps, it is understood that different orders of steps, additional steps, or fewer steps may be included without departing from the scope of the disclosure.

Steps of method 1100 may be performed with steps of method 1000. In some embodiments, the method 1100 is performed with at least one of MR system 112. MR system 200, wearable head device 400A, audio system 700, and wearable head device 800. For the sake of brevity, some elements and advantages associated with these systems are not repeated here.

In some embodiments, the method 1100 includes receiving a signal (step 1102). For example, as described with respect to FIGS. 7-9, an audio system (e.g., audio system 700) receives a signal associated with an application on the wearable head device (e.g., a software-generated signal). In some embodiments, the signal is a first signal associated with a first mode of the audio system or a second signal associated with a second mode of the audio system.

In some embodiments, the method 1100 includes in response to the received signal comprising a first signal, operating the audio system in a first mode (step 1104). For example, as described with respect to FIGS. 7-9, an audio system (e.g., audio system 700) receives a first signal associated with a first mode of the audio system. In response to receiving the first signal, the wearable head device operates the audio system in the first mode (e.g., the first signal causes the audio system to operate in the first mode), as described with respect to FIGS. 7-9. For example, operating the audio system in the first mode includes forming a sealed enclosure in a speaker component of the audio system. As another example, operating the audio system in the first mode includes operating the audio system in a first configuration (e.g., first position of a sliding door, a first port status (e.g., open, closed, partially closed), first position of a plug, first acoustic volume dimension). The first signal can specify a first value that corresponds to the first configuration of the audio system. For the sake of brevity, some elements and advantages associated with this step that were described are not repeated here.

In some embodiments, the method 1100 includes in response to the received signal comprising a second signal, operating the audio system in a second mode (step 1106). For example, as described with respect to FIGS. 7-9, an audio system (e.g., audio system 700) receives a second signal associated with a second mode of the audio system. In response to receiving the second signal, the wearable head device operates the audio system in the second mode (e.g., the second signal causes the audio system to operate in the second mode), as described with respect to FIGS. 7-9. For example, operating the audio system in the second mode includes forming a ported enclosure in a speaker component of the audio system. As another example, operating the audio system in the second mode includes operating the audio system in a second configuration (e.g., second position of a sliding door, a second port status (e.g., open, closed, partially closed), second position of a plug, second acoustic volume dimension). The second signal can specify a second value that corresponds to the second configuration of the audio system. For the sake of brevity, some elements and advantages associated with this step that were described are not repeated here.

According to some embodiments, a wearable head device comprises an audio system, wherein: the audio system comprises a speaker component, the speaker component comprises an enclosure, the audio system is configured to operate in a first mode and a second mode, in accordance with the audio system operating in the first mode, the enclosure comprises a sealed enclosure, and in accordance with the audio system operating in the second mode, the enclosure comprises a ported enclosure.

According to some embodiments, a port of the audio signal is configured to operate in one or more of a closed state and an open state, in accordance with the audio system operating in the first mode, a port of the audio system operates in the closed state, and in accordance with the audio system operating in the second mode, the port of the audio system operates in the open state.

According to some embodiments, in accordance with the audio system operating in the second mode, the audio system provides a first audio radiation at a first level in a first direction and a second audio radiation at a second level in a second direction, and the second level is lower than the first level.

According to some embodiments, the first mode is associated with a first application running on the wearable head device, the audio system operates in the first mode in accordance with a determination that the first application is running on the wearable head device, the second mode is associated with a second application of the wearable head device, and the audio system operates in the second mode in accordance with a determination that the second application is running on the wearable head device.

According to some embodiments, the device further comprises a digital signal processor (DSP), wherein: the DSP is configured to operate in one or more of a first setting and a second setting, in accordance with the audio system operating in the first mode, the DSP operates in the first setting, and in accordance with the audio system operating in the second mode, the DSP operates in the second setting.

According to some embodiments, the device further comprises a mechanical system, wherein: the mechanical system is configured to define one or more of the sealed enclosure and the ported enclosure, in accordance with the audio system operating in the first mode, the mechanical system defines the sealed enclosure, and in accordance with the audio system operating in the second mode, the mechanical system defines the ported enclosure.

According to some embodiments, the device further comprises a feedback sensor configured to indicate presence of feedback in an environment of the wearable head device, wherein: the audio system is further configured to operate in a third mode, and in response to receiving data, from the feedback sensor, indicating presence of feedback in the environment of the wearable head device.

According to some embodiments, the audio system comprises a sliding door, and the sliding door is configured to define the sealed enclosure and the ported enclosure.

According to some embodiments, the audio system comprises a ductile plug, and the ductile plug is configured to define the sealed enclosure and the ported enclosure.

According to some embodiments, the device is configured to receive first sensor data and second sensor data, wherein: the audio system is configured to operate in the first mode in response to the device receiving the first sensor data, and the audio system is configured to operate in the second mode in response to the device receiving the second sensor data.

According to some embodiments, the audio system is further configured to operate in a third mode and to present spatial audio associated with a virtual environment of the wearable head device, and the third mode is associated with the spatial audio.

According to some embodiments, the audio system is configured to operate in the first mode in response to receiving a first signal, and the audio system is configured to operate in the second mode in response to receiving a second signal.

According to some embodiments, a wearable head device comprising an audio system, wherein: the audio system comprises at least one of a port, a dynamic driver, a back volume, a front volume, a tunnel, a funnel, a reflector, and a diffuser, the audio system is configured to operate in a first mode and a second mode, in accordance with the audio system operating in the first mode, the at least one of the port, the dynamic driver, the back volume, the front volume, the tunnel, the funnel, the reflector, and the diffuser is in a first configuration, and in accordance with the audio system operating in the second mode, the at least one of the port, the dynamic driver, the back volume, the front volume, the tunnel, the funnel, the reflector, and the diffuser is in a second configuration.

According to some embodiments, a method of operating a wearable head device comprising an audio system, wherein: the audio system comprises a speaker component, and the speaker component comprises an enclosure, the method comprising: in accordance with a determination that the audio system is operating in a first mode, configuring the enclosure to comprise a sealed enclosure; and in accordance with a determination that the audio system is operating in a second mode, configuring the enclosure to comprise a ported enclosure.

According to some embodiments, the method further comprises: in accordance with a determination that the audio system is operating in the first mode, closing a port of the audio system; and in accordance with a determination that the audio system is operating in the second mode, opening the port of the audio system.

According to some embodiments, the method further comprises in accordance with a determination that the audio system is operating in the second mode, providing a first audio radiation at a first level in a first direction and a second audio radiation at a second level in a second direction, wherein the second level is lower than the first level.

According to some embodiments, the first mode is associated with a first application running on the wearable head device, the second mode is associated with a second application of the wearable head device, the method further comprises determining an application running on the wearable head device, the audio system operates in the first mode in accordance with a determination that the first application is running on the wearable head device, and the audio system operates in the second mode in accordance with a determination that the second application is running on the wearable head device.

According to some embodiments, the wearable head device further comprises a digital signal processor (DSP) configured to operate in one or more of a first setting and a second setting, the method further comprising: in accordance with a determination that the audio system is operating in the first mode, operating the DSP in the first setting; and in accordance with a determination that the audio system is operating in the second mode, operating the DSP in the second setting.

According to some embodiments, the wearable head device further comprises a mechanical system, the mechanical system is configured to define one or more of the sealed enclosure and the ported enclosure, the method further comprising: in accordance with the audio system operating in the first mode, defining, with the mechanical system, the sealed enclosure; and in accordance with the audio system operating in the second mode, defining, with the mechanical system, the ported enclosure.

According to some embodiments, the wearable head device further comprises a feedback sensor configured to indicate presence of feedback in an environment of the wearable head device, the method further comprising in response to receiving data, from the feedback sensor, indicating presence of feedback in the environment of the wearable head device, operating the audio system in a third mode.

According to some embodiments, the audio system comprises a sliding door, and the sliding door is configured to define the sealed enclosure and the ported enclosure.

According to some embodiments, the audio system comprises a ductile plug, and the ductile plug is configured to define the sealed enclosure and the ported enclosure.

According to some embodiments, the wearable head device is configured to receive first sensor data and second sensor data, the method further comprising receiving sensor data, wherein: the audio system is configured to operate in the first mode in response to the device receiving the first sensor data, and the audio system is configured to operate in the second mode in response to the device receiving the second sensor data.

According to some embodiments, the method further comprises: operating the audio system in a third mode is associated with a spatial audio associated with a virtual environment of the wearable head device; and in accordance with the audio system operating in the third mode, presenting the spatial audio.

According to some embodiments, the method further comprises receiving a signal, wherein: the audio system operates in the first mode in accordance with a determination that the signal comprises a first signal, and the audio system operates in the second mode in accordance with a determination that the signal comprises a second signal.

According to some embodiments, a method of operating a wearable head device comprising an audio system, wherein the audio system comprises at least one of a port, a dynamic driver, a back volume, a front volume, a tunnel, a funnel, a reflector, and a diffuser, the method comprises: in accordance with the audio system operating in the first mode, configuring the at least one of the port, the dynamic driver, the back volume, the front volume, the tunnel, the funnel, the reflector, and the diffuser in a first configuration; and in accordance with the audio system operating in the second mode, configuring the at least one of the port, the dynamic driver, the back volume, the front volume, the tunnel, the funnel, the reflector, and the diffuser in a second configuration.

According to some embodiments, a non-transitory computer-readable medium stores instructions that, when executed by one or more processors, cause the one or more processors to execute a method of operating a wearable head device comprising an audio system, wherein: the audio system comprises a speaker component, and the speaker component comprises an enclosure, the method comprising: in accordance with a determination that the audio system is operating in a first mode, configuring the enclosure to comprise a sealed enclosure; and in accordance with a determination that the audio system is operating in a second mode, configuring the enclosure to comprise a ported enclosure.

According to some embodiments, the method further comprises: in accordance with a determination that the audio system is operating in the first mode, closing a port of the audio system; and in accordance with a determination that the audio system is operating in the second mode, opening the port of the audio system.

According to some embodiments, the method further comprises in accordance with a determination that the audio system is operating in the second mode, providing a first audio radiation at a first level in a first direction and a second audio radiation at a second level in a second direction, wherein the second level is lower than the first level.

According to some embodiments, the first mode is associated with a first application running on the wearable head device, the second mode is associated with a second application of the wearable head device, the method further comprises determining an application running on the wearable head device, the audio system operates in the first mode in accordance with a determination that the first application is running on the wearable head device, and the audio system operates in the second mode in accordance with a determination that the second application is running on the wearable head device.

According to some embodiments, the wearable head device further comprises a digital signal processor (DSP) configured to operate in one or more of a first setting and a second setting, and the method further comprises: in accordance with a determination that the audio system is operating in the first mode, operating the DSP in the first setting; and in accordance with a determination that the audio system is operating in the second mode, operating the DSP in the second setting.

According to some embodiments, the wearable head device further comprises a mechanical system, the mechanical system is configured to define one or more of the sealed enclosure and the ported enclosure, and the method further comprises: in accordance with the audio system operating in the first mode, defining, with the mechanical system, the sealed enclosure; and in accordance with the audio system operating in the second mode, defining, with the mechanical system, the ported enclosure.

According to some embodiments, the wearable head device further comprises a feedback sensor configured to indicate presence of feedback in an environment of the wearable head device, and the method further comprises in response to receiving data, from the feedback sensor, indicating presence of feedback in the environment of the wearable head device, operating the audio system in a third mode.

According to some embodiments, the audio system comprises a sliding door, and the sliding door is configured to define the sealed enclosure and the ported enclosure.

According to some embodiments, the audio system comprises a ductile plug, and the ductile plug is configured to define the sealed enclosure and the ported enclosure.

According to some embodiments, the wearable head device is configured to receive first sensor data and second sensor data, and the method further comprises receiving sensor data, wherein: the audio system is configured to operate in the first mode in response to the device receiving the first sensor data, and the audio system is configured to operate in the second mode in response to the device receiving the second sensor data.

According to some embodiments, the method further comprises: operating the audio system in a third mode is associated with a spatial audio associated with a virtual environment of the wearable head device; and in accordance with the audio system operating in the third mode, presenting the spatial audio.

According to some embodiments, the method further comprises receiving a signal, the audio system operates in the first mode in accordance with a determination that the signal comprises a first signal, and the audio system operates in the second mode in accordance with a determination that the signal comprises a second signal.

According to some embodiments, a non-transitory computer-readable medium stores instructions that, when executed by one or more processors, cause the one or more processors to execute a method of operating a wearable head device comprising an audio system, wherein: the audio system comprises at least one of a port, a dynamic driver, a back volume, a front volume, a tunnel, a funnel, a reflector, and a diffuser, and the method comprises: in accordance with the audio system operating in the first mode, configuring the at least one of the port, the dynamic driver, the back volume, the front volume, the tunnel, the funnel, the reflector, and the diffuser in a first configuration; and in accordance with the audio system operating in the second mode, configuring the at least one of the port, the dynamic driver, the back volume, the front volume, the tunnel, the funnel, the reflector, and the diffuser in a second configuration.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A wearable head device comprising:

an audio system, and a camera, wherein:

the audio system comprises a speaker component, the speaker component comprises an enclosure, the audio system is configured to operate in a first mode and a second mode, in accordance with the audio system receiving a first control signal corresponding to the first mode, the audio system operates in the first mode and the enclosure comprises a sealed enclosure, and in accordance with the audio system receiving a second control signal corresponding to the second mode, the audio system operates in the second mode and the enclosure comprises a ported enclosure, wherein the first control signal is generated based on a first location or a first orientation of a user of the wearable head device within a virtual environment and further based on visual data from the camera, and wherein the second control signal is generated based on a second location or a second orientation of the user of the wearable head device within the virtual environment and further based on the visual data from the camera, wherein the first control signal is generated further in accordance with a determination, based on the visual data from the camera, that a preference of the user does not comprise any of privacy, reduced interference, and reduced disturbance, and wherein the second control signal is generated further in accordance with a determination, based on the visual data from the camera, that the preference of the user comprises one or more of privacy, reduced interference, and reduced disturbance.

2. The wearable head device of claim 1, wherein:

a port of the audio system is configured to operate in one or more of a closed state and an open state, in accordance with the audio system operating in the first mode, the port of the audio system operates in the closed state, and in accordance with the audio system operating in the second mode, the port of the audio system operates in the open state.

3. The wearable head device of claim 1, wherein:

in accordance with the audio system operating in the second mode, the audio system provides a first audio radiation at a first level in a first direction and a second audio radiation at a second level in a second direction, and the second level is lower than the first level.

4. The wearable head device of claim 1, wherein:

the first mode is associated with a first application running on the wearable head device, the first application is configured to present the first control signal, the second mode is associated with a second application of the wearable head device, and the second application is configured to present the second control signal.

5. The wearable head device of claim 1, further comprising a digital signal processor (DSP), wherein:

the DSP is configured to operate in one or more of a first setting and a second setting, in accordance with the audio system operating in the first mode, the DSP operates in the first setting, and in accordance with the audio system operating in the second mode, the DSP operates in the second setting.

6. The wearable head device of claim 1, further comprising a mechanical system, wherein:

the mechanical system is configured to define one or more of the sealed enclosure and the ported enclosure, in accordance with the audio system operating in the first mode, the mechanical system defines the sealed enclosure, and in accordance with the audio system operating in the second mode, the mechanical system defines the ported enclosure.

7. The wearable head device of claim 1, further comprising a feedback sensor configured to indicate presence of feedback in an environment of the wearable head device, wherein:

the audio system is further configured to operate in a third mode in response to receiving data, from the feedback sensor, indicating presence of feedback in the environment of the wearable head device.

8. The wearable head device of claim 1, wherein:

the audio system comprises a sliding door, and the sliding door is configured to define the sealed enclosure and the ported enclosure.

9. The wearable head device of claim 1, wherein:

the audio system comprises a ductile plug, and the ductile plug is configured to define the sealed enclosure and the ported enclosure.

10. The wearable head device of claim 1, wherein the device is configured to receive first sensor data and second sensor data, wherein:

the first control signal is based on the first sensor data, and the second control signal is based on the second sensor data.

11. The wearable head device of claim 1, wherein:

the audio system is further configured to present spatial audio associated with the virtual environment.

12. The wearable head device of claim 1, wherein:

the audio system comprises at least one of a port, a dynamic driver, a back volume, a front volume, a tunnel, a funnel, a reflector, and a diffuser, in accordance with the audio system operating in the first mode, the at least one of the port, the dynamic driver, the back volume, the front volume, the tunnel, the funnel, the reflector, and the diffuser is in a first configuration, and in accordance with the audio system operating in the second mode, the at least one of the port, the dynamic driver, the back volume, the front volume, the tunnel, the funnel, the reflector, and the diffuser is in a second configuration.

13. A method of operating a wearable head device comprising an audio system, wherein:

the audio system comprises:

a speaker component, and a camera, and the speaker component comprises an enclosure, the method comprising:

in accordance with receiving a first control signal corresponding to a first mode, configuring the audio system to operate in the first mode and configuring the enclosure to comprise a sealed enclosure; and in accordance with receiving a second control signal corresponding to a second mode, configuring the audio system to operate in the second mode and configuring the enclosure to comprise a ported enclosure, wherein the first control signal is generated based on a first location or a first orientation of a user of the wearable head device within a virtual environment and further based on visual data from the camera, and wherein the second control signal is generated based on a second location or a second orientation of the user of the wearable head device within the virtual environment and further based on the visual data from the camera, wherein the first control signal is generated further in accordance with a determination, based on the visual data from the camera, that a preference of the user does not comprise any of privacy, reduced interference, and reduced disturbance, and wherein the second control signal is generated further in accordance with a determination, based on the visual data from the camera, that the preference of the user comprises one or more of privacy, reduced interference, and reduced disturbance.

14. The method of claim 13, further comprising:

in accordance with the audio system operating in the first mode, closing a port of the audio system; and in accordance with the audio system operating in the second mode, opening the port of the audio system.

15. The method of claim 13, further comprising: in accordance with the audio system operating in the second mode, providing a first audio radiation at a first level in a first direction and a second audio radiation at a second level in a second direction, wherein the second level is lower than the first level.

16. The method of claim 13, wherein:

the first control signal is received via a first application running on the wearable head device, and the second control signal is received via a second application running on the wearable head device.

17. The method of claim 13, wherein the wearable head device further comprises a digital signal processor (DSP) configured to operate in one or more of a first setting and a second setting, the method further comprising:

in accordance with the audio system operating in the first mode, operating the DSP in the first setting; and in accordance with the audio system operating in the second mode, operating the DSP in the second setting.

18. A non-transitory computer-readable medium storing instructions that, when executed by one or more processors, cause the one or more processors to perform a method of operating a wearable head device comprising an audio system and a camera, wherein:

the audio system comprises a speaker component, and the speaker component comprises an enclosure, the method comprising:

in accordance with receiving a first control signal corresponding to a first mode, configuring the audio system to operate in the first mode and configuring the enclosure to comprise a sealed enclosure; and in accordance with receiving a second control signal corresponding to a second mode, configuring the audio system to operate in the second mode and configuring the enclosure to comprise a ported enclosure, wherein the first control signal is generated based on a first location or a first orientation of a user of the wearable head device within a virtual environment and further based on visual data from the camera, and wherein the second control signal is generated based on a second location or a second orientation of the user of the wearable head device within the virtual environment and further based on the visual data from the camera, wherein the first control signal is generated further in accordance with a determination, based on the visual data from the camera, that a preference of the user does not comprise any of privacy, reduced interference, and reduced disturbance, and wherein the second control signal is generated further in accordance with a determination, based on the visual data from the camera, that the preference of the user comprises one or more of privacy, reduced interference, and reduced disturbance.

* * * * *